United States Patent
Ozawa et al.

(10) Patent No.: US 9,395,709 B2
(45) Date of Patent: Jul. 19, 2016

(54) UTILIZATION-TIME CHANGING SUPPORT DEVICE AND METHOD OF SUPPORTING CHANGE IN UTILIZATION TIME

(75) Inventors: Jun Ozawa, Nara (JP); Tsuyoshi Inoue, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1117 days.

(21) Appl. No.: 13/396,693

(22) Filed: Feb. 15, 2012

(65) Prior Publication Data

US 2012/0150463 A1 Jun. 14, 2012

Related U.S. Application Data

(63) Continuation of application No. PCT/JP2010/004332, filed on Jul. 1, 2010.

(30) Foreign Application Priority Data

Aug. 28, 2009 (JP) .................................. 2009-199003

(51) Int. Cl.
*G05B 15/02* (2006.01)

(52) U.S. Cl.
CPC ....................... *G05B 15/02* (2013.01)

(58) Field of Classification Search
CPC ......... G06F 19/00; G01R 21/00; G05B 15/02
USPC ..................................................... 702/61, 62
See application file for complete search history.

(56) References Cited

U.S. PATENT DOCUMENTS

2005/0099314 A1*  5/2005  Aisa .............................. 340/637
2007/0241739 A1* 10/2007  Uenou ................. G01R 21/133
                                                         324/76.17

(Continued)

FOREIGN PATENT DOCUMENTS

EP    1 729 223    12/2006
JP    9-009502     1/1997

(Continued)

OTHER PUBLICATIONS

International Search Report issued Sep. 28, 2010 in International (PCT) Application No. PCT/JP2010/004332.

(Continued)

*Primary Examiner* — Bryan Bui
(74) *Attorney, Agent, or Firm* — Wenderoth, Lind & Ponack, L.L.P.

(57) ABSTRACT

Provided is a utilization-time changing support device including: a household-electrical-appliance power record storage unit storing records of power consumption for each household electrical appliance used in a living space; a power record writing unit receiving information indicating the power consumption of the household electrical appliance from a measuring device that measures the power consumption, and writing, into the household-electrical-appliance power record storage unit, a record of the information as one of the records of the power consumption; a regular use determining unit determining whether or not the household electrical appliance used during a predetermined period is regularly used, based on the records of the power consumption; and a period change possibility determining unit outputting (i) whether or not a utilization period of the household electrical appliance can be changed and (ii) another utilization period as a result of the determination, based on the records of the power consumption.

14 Claims, 41 Drawing Sheets

(56) References Cited

U.S. PATENT DOCUMENTS

2009/0195349 A1* 8/2009 Frader-Thompson et al. 340/3.1
2010/0305889 A1* 12/2010 Tomlinson et al. ............. 702/62

FOREIGN PATENT DOCUMENTS

| JP | 2002-142384 | 5/2002 |
|---|---|---|
| JP | 2002-311070 | 10/2002 |
| JP | 2003-070162 | 3/2003 |
| JP | 2003-319572 | 11/2003 |
| JP | 2004-222375 | 8/2004 |
| JP | 2007-014179 | 1/2007 |
| JP | 2008-136334 | 6/2008 |

OTHER PUBLICATIONS

T. Yoshimitsu et al., "Development of electric usage supporting system for domestic customer—Development of the functions for electric usage support and evaluation of this function—", Communication & Information Research Laboratory Rep. No. 99011, May 2000, with partial English translation.

* cited by examiner

FIG. 3

| Date | Time | Total power consumption of household |
|---|---|---|
| ... | ... | ... |
| October 1 | 6:00:00 | 2000 W |
| October 1 | 6:00:30 | 2050 W |
| October 1 | 6:01:00 | 2028 W |
| October 1 | 6:01:30 | 2102 W |
| October 1 | 6:02:00 | 2156 W |
| October 1 | 6:02:30 | 2189 W |
| October 1 | 6:03:00 | 2234 W |
| October 1 | 6:03:30 | 2264 W |
| ... | ... | ... |

FIG. 4

| | Date | Time | Power consumption of household |
|---|---|---|---|
| ... | ... | ... | ... |
| Microwave oven | October 1 | 6:00:00 | 1480 W |
| Microwave oven | October 1 | 6:00:30 | 1490 W |
| Microwave oven | October 1 | 6:01:00 | 1500 W |
| Microwave oven | October 1 | 6:01:30 | 1500 W |
| Microwave oven | October 1 | 6:02:00 | 1480 W |
| Microwave oven | October 1 | 6:02:30 | 1480 W |
| Toaster | October 1 | 6:10:00 | 1080 W |
| Toaster | October 1 | 6:10:30 | 1080 W |
| Toaster | October 1 | 6:11:00 | 1100 W |
| Toaster | October 1 | 6:11:30 | 1100 W |
| Toaster | October 1 | 6:12:00 | 1090 W |
| Toaster | October 1 | 6:12:30 | 1090 W |
| ... | ... | ... | ... |

FIG. 5

| Date | Time | Total amount of power consumption of household |
|---|---|---|
| ... | ... | ... |
| October 1 | 6:00 | 1320 Wh |
| October 1 | 6:30 | 920 Wh |
| October 1 | 7:00 | 1020 Wh |
| October 1 | 7:30 | 920 Wh |
| October 1 | 8:00 | 880 Wh |
| October 1 | 8:30 | 750 Wh |
| October 1 | 9:00 | 780 Wh |
| October 1 | 9:30 | 620 Wh |
| ... | ... | ... |

FIG. 16

| | Period can be changed | Total power consumption can be reduced | Utilization period can be shortened | Processes can be divided |
|---|---|---|---|---|
| Laundry machine | Yes | No | Yes | Yes |
| Iron | Yes | No | Yes | No |
| Air conditioner | No | Yes | Yes | No |
| Television | No | No | Yes | No |
| Automatic rice cooker | Yes | No | No | Yes |
| Dishwasher | Yes | No | Yes | Yes |
| ... | ... | ... | ... | ... |

FIG. 17

| | First process | Second process |
|---|---|---|
| Laundry machine | 400 W (Washing) | 700 W (Drying) |
| | 20 minutes - 30 minutes | 40 minutes - 50 minutes |
| Dishwasher | 600 W (Washing) | 400 W (Drying) |
| | 15 minutes - 20 minutes | 20 minutes - 30 minutes |
| Automatic rice cooker | 800 W (Cooking rice) | 200 W (Warming) |
| | 30 minutes - 40 minutes | More than 10 minutes |
| ... | ... | ... |

FIG. 18

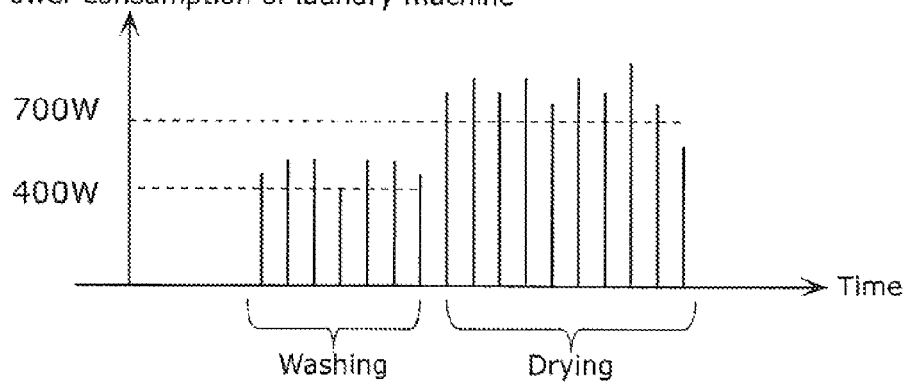

FIG. 20

| Lifestyle | Target household electrical appliance | Detection of utilization start time | Detection of end time |
|---|---|---|---|
| Meal preparation | IH stove, automatic rice cooker, microwave oven, toaster, dishwasher | IH stove  Start<br>Automatic rice cooker  Start cooking rice<br>Microwave oven  Start<br>Toaster  Start | IH stove  End<br>Automatic rice cooker  Start warming<br>Automatic rice cooker  End of cooking<br>Microwave oven  End<br>Dishwasher  Start |
| Taking a bath | Water heater, drying bathroom, hair dryer, electric light in bathroom | Water heater  Start<br>Electric light in bathroom  ON | Electric light in bathroom  OFF<br>Hair dryer  Start<br>Laundry machine  Start |
| Watching movies | Television, recorder, amplifier, home theater system | Television  Start<br>Recorder  Start<br>Home theater system  Start | Television  End<br>Recorder  End |
| ... | ... | ... | ... |

FIG. 21

| Lifestyle | Search period |
|---|---|
| Meal preparation | 5:00 - 10:00<br>11:00 - 14:00<br>16:00 - 21:00 |
| Taking a bath | 17:00 - 24:00 |
| Watching movies | 6:00 - 24:00 |
| ... | |

FIG. 27

| Daily life event | Target household electrical appliance | Detection of event time |
|---|---|---|
| Waking up | Air conditioner, electric light, television | Start time of air conditioner in morning<br>ON time of electric light<br>Start time of television |
| Going to bed | Air conditioner, electric light, television | End time of air conditioner<br>OFF time of electric light |
| Outing | Air conditioner, electric light | End time of air conditioner<br>OFF time of electric light |
| Returning home | Air conditioner, electric light | Start time of air conditioner<br>ON time of electric light<br>Start time of television |

FIG. 32

| Attribute | Class (classification) | Variance | Distribution |
|---|---|---|---|
| Day-of-week | Weekday | 2.3 | Morning / Afternoon → Time |
| | Weekend | 1.0 | → Time |
| Weather | Fine | 4.2 | → Time |
| | Cloudy | 6.4 | → Time |
| | Rain | 7.2 | → Time |
| Utilization start time of air conditioner | Morning | 5.8 | → Time |
| | Afternoon | 6.2 | → Time |
| ... | ... | ... | ... |

FIG. 35

| Household electrical appliance | Event | July 10 | July 11 | July 12 | July 13 | ... | Occurrence probability |
|---|---|---|---|---|---|---|---|
| Water heater | Turn ON | | Yes | | | ... | 1/10 = 0.1 |
| Water heater | Turn OFF | | Yes | Yes | Yes | ... | 9/10 = 0.9 |
| Air conditioner | Turn ON | | Yes | | Yes | ... | 2/10 = 0.2 |
| Air conditioner | Turn OFF | Yes | | Yes | | ... | 3/10 = 0.3 |
| Automatic rice cooker | Turn OFF | | | | Yes | ... | 2/10 = 0.2 |
| Television | Turn OFF | | Yes | | | ... | 1/10 = 0.1 |
| Washstand light | Turn ON | Yes | Yes | Yes | Yes | ... | 9/10 = 0.9 |
| Hair dryer | Turn ON | | | Yes | | ... | 2/10 = 0.2 |
| ... | ... | ... | ... | ... | ... | ... | |

| Room | Utilized household electrical appliance |
|---|---|
| Room A | Office personal computer A, Office personal computer B, Air conditioner A |
| Room B | Office personal computer C, Office personal computer D, Air conditioner B |

UTILIZATION-TIME CHANGING SUPPORT DEVICE AND METHOD OF SUPPORTING CHANGE IN UTILIZATION TIME

CROSS REFERENCE TO RELATED APPLICATION

This is a continuation application of PCT Patent Application No. PCT/JP2010/004332 filed on Jul. 1, 2010, designating the United States of America, which is based on and claims priority of Japanese Patent Application No. 2009-199003 filed on Aug. 28, 2009. The entire disclosures of the above-identified applications, including the specifications, drawings and claims are incorporated herein by reference in their entirety.

BACKGROUND OF THE INVENTION (1) Field of the Invention

The present invention relates to a utilization-time changing support device that supports change in a utilization time of a household electrical appliance based on measured power consumption of the appliance, and a method of supporting change in the utilization time of the household electrical appliance.

(2) Description of the Related Art

Conventionally, when electric power is measured in each of households and factories and the measured electric power is likely to exceed a predetermined upper limit, a technique of interrupting the flow of electricity by a circuit breaker is known (for example, see Japanese Unexamined Patent Application Publication No. 2003-319572 hereinafter referred to as Patent Reference 1). In Patent Reference 1, before the circuit breaker trips, power supply to a household electrical appliance is stopped, based on power consumption of the appliance and electric power data in a power distribution board. Thus, the peak power consumption can be reduced in advance. In particular, when total power consumption of household electrical appliances in a household is larger than a predetermined rate of the available total electric power, the power in the household is automatically turned off. Furthermore, a system that advises a utilization period of a household electrical appliance to save the electricity expense is proposed (for example, see "Development of electric usage supporting system for domestic customer. Development of the functions for electric usage support and evaluation of this function", Tsukasa Yoshimitsu and et al., Central Research Institute of Electric Power Industry (CRIEPI) Report, CRIEPI R99011, May 2000 hereinafter referred to as Non-Patent Reference 1). This system predicts an operation schedule for each household electrical appliance based on the past utilization record. Furthermore, the system determines whether or not the utilization of household electrical appliances with large power consumption is predicted during a period when the electric rate is high, based on the electric rate information by season and time-of-day rate system. When the utilization of household electrical appliances with large power consumption is predicted during a period when the electric rate is high, the system advises changing the utilization period to a period when the electric rate is low.

However, Patent Reference 1 discloses a case where although the peak power consumption can be reduced in advance, the operation that has been already started is suspended because the user is notified that the amount of power consumption is large after starting using the household electrical appliance. Furthermore, Non-Patent Reference 1 proposes changing the utilization period of a household electrical appliance that has been used in the past during the period when the electric rate is high. However, depending on each household, household electrical appliances are categorized into the appliances in which the utilization periods can be easily changed and the appliances having difficulties in changing the utilization periods. Thus, even when the system advises changing utilization periods of all household electrical appliances that have been used in the past, the household electrical appliances may include household electrical appliances having difficulties in changing the utilization periods. Thus, there is a problem that the utilization periods of the household electrical appliances cannot be appropriately changed. In particular, there is a problem that the peak power consumption cannot be appropriately reduced.

The present invention has been conceived in view of the problems, and has an object of providing a utilization-time changing support device that appropriately supports change in a utilization time of a household electrical appliance, and a method of supporting change in the utilization time of the household electrical appliance.

SUMMARY OF THE INVENTION

In order to achieve the object, a utilization-time changing support device according to an aspect of the present invention includes: a household-electrical-appliance power record storage unit configured to store records of power consumption for each household electrical appliance used in a living space; a power record writing unit configured to receive information indicating the power consumption of the household electrical appliance from a measuring device that measures the power consumption, and write, into the household-electrical-appliance power record storage unit, a record of the information as one of the records of the power consumption; a regular use determining unit configured to determine whether or not the household electrical appliance used during a predetermined period is regularly used, based on the records of the power consumption stored in the household-electrical-appliance power record storage unit; and a period change possibility determining unit configured to output (i) whether or not a utilization period of the household electrical appliance determined by the regular use determining unit as being regularly used can be changed and (ii) an other utilization period as a result of the determination, based on the records of the power consumption of the household electrical appliance.

With the configuration, the possibility of changing a utilization period is determined based on the records of power consumption of a household electrical appliance regularly used during a predetermined period. Thus, it is possible to supports change in a utilization period of, preferentially, a household electrical appliance used on a daily basis. Furthermore, it is possible to supports change in a utilization period of only a household electrical appliance of which utilization period can be changed, by determining whether or not the utilization period can be changed and another utilization period, based on the records of the power consumption of the appliance. Accordingly, it is possible to appropriately support change in a utilization period of a household electrical appliance.

The present invention can be implemented not only as a utilization-time changing support device including such characteristic processing units but also as a utilization-time changing support method using these characteristic processing units as steps. Furthermore, the present invention may be implemented as a program causing a computer to execute such steps included in the utilization-time changing support method. It is obvious that such a program can be distributed using recording media such as a CD-ROM, and via communication networks such as the Internet.

According to the present invention, it is possible to appropriately support change in a utilization period of a household electrical appliance.

BRIEF DESCRIPTION OF THE DRAWINGS

These and other objects, advantages and features of the invention will become apparent from the following description thereof taken in conjunction with the accompanying drawings that illustrate a specific embodiment of the present invention. In the Drawings:

FIG. 3 illustrates an example of records of total power consumption stored in a household power record storing unit;

FIG. 4 illustrates an example of records of power consumption of each household electrical appliance that are stored in the household electrical appliance power record storing unit;

FIG. 5 illustrates an example of records of the total amount of power consumption;

FIG. 16 illustrates characteristics of household electrical appliances;

FIG. 17 illustrates an example of process dividing pattern information;

FIG. 18 is a graph representing time series records of power consumed by a laundry machine;

FIG. 20 illustrates an example of correspondence information indicating a relationship between household electrical appliances and lifestyles stored in a by-lifestyle household electrical appliance storage unit;

FIG. 21 illustrates a relationship between lifestyles and search periods;

FIG. 27 illustrates correspondence between daily life events and household electrical appliances to be used in the daily life events;

FIG. 32 illustrates a method of determining an incidental condition;

FIG. 35 illustrates events of household electrical appliances before a laundry machine starts to be used;

DESCRIPTION OF THE PREFERRED EMBODIMENTS

The present invention proposes the technique of (i) estimating, in each household, a household electrical appliance of which the utilization period can be easily changed and another utilization period at which the appliance can be used, based on records of power consumption of the appliance, and (ii) changing the utilization time of the appliance. Hereinafter, Embodiments will be described for the purpose of reducing the peak power consumption. With the technique of proposing change in the utilization time of a household electrical appliance, the present invention is applicable to use the appliance during a time when the electric rate is low and to use the appliance during a period with high electrical power output from a solar power system and others.

(Embodiment 1)

Figure 1:
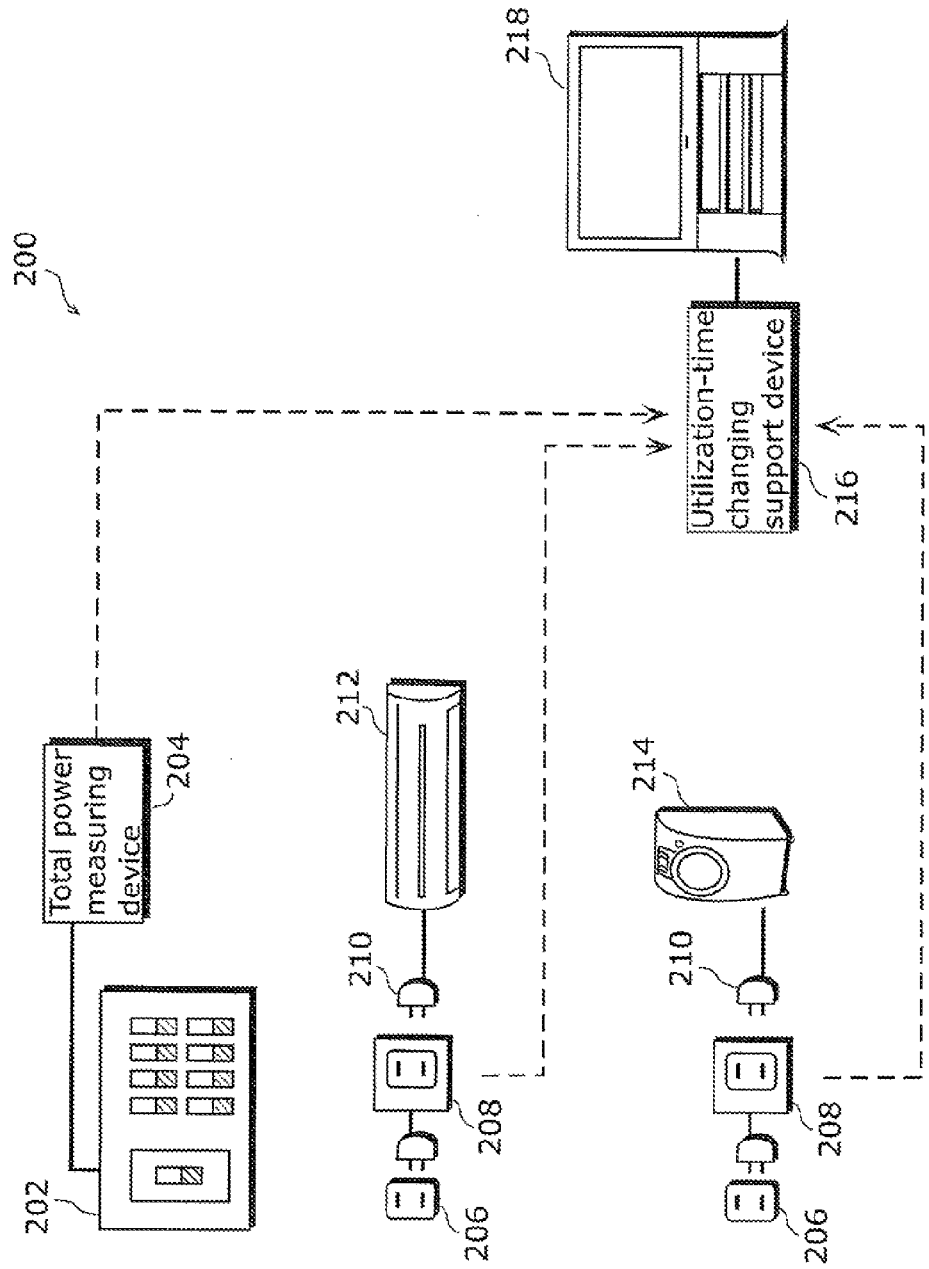
FIG. 1 illustrates a hardware construction of a power measuring system according to Embodiment 1 of the present invention.

FIG. 1 illustrates a hardware construction of a power measuring system 200 according to Embodiment 1 of the present invention.

The power measuring system 200 is a system that measures the power consumption of each household electrical appliance in a household and reduces the peak power consumption of the household. The power measuring system 200 includes a total power measuring device 204, power consumption measuring devices 208, an air conditioner 212, a laundry machine 214, a utilization-time changing support device 216, and a digital television 218.

The total power measuring device 204 calculates power consumed in a household, based on a current used in the household and measured by a clamp-on current sensor attached to a power distribution board 202 in the household.

Each of the power consumption measuring devices 208 measures power consumed by each household electrical appliance. The power consumption measuring device 208 is provided between a plug 210 of each household electrical appliance (for example, the air conditioner 212 or the laundry machine 214) and a wall outlet 206 in the household. With the power consumption measuring device 208 provided in the position, the power consumption of each household electrical appliance can be measured even when the appliance does not have a power measuring function.

Each of the total power measuring device 204 and the power consumption measuring device 208 transmits the power consumption information of measured total power consumption of the household and the power consumption information of each appliance at regular intervals (for example, intervals of 30 seconds) to the utilization-time changing support device 216 via a wireless network.

The utilization-time changing support device 216 includes recording media, such as a wireless network unit and a hard disk, and is a device that can store the collected power consumption information. Furthermore, the utilization-time changing support device 216 analyzes the collected power consumption information, and presents advice on the power consumption and energy saving at each household to the user through a monitor of the digital television 218 and others. A CPU included in the utilization-time changing support device 216 analyzes the power consumption information by executing an analysis program. In recent years, the computational capability of the digital television 218 has been increased. Thus, a CPU included in the digital television 218 may analyze the power consumption information by executing the analysis program. Furthermore, the information may be analyzed using a general purpose computer, such as a personal computer.

Figure 2:
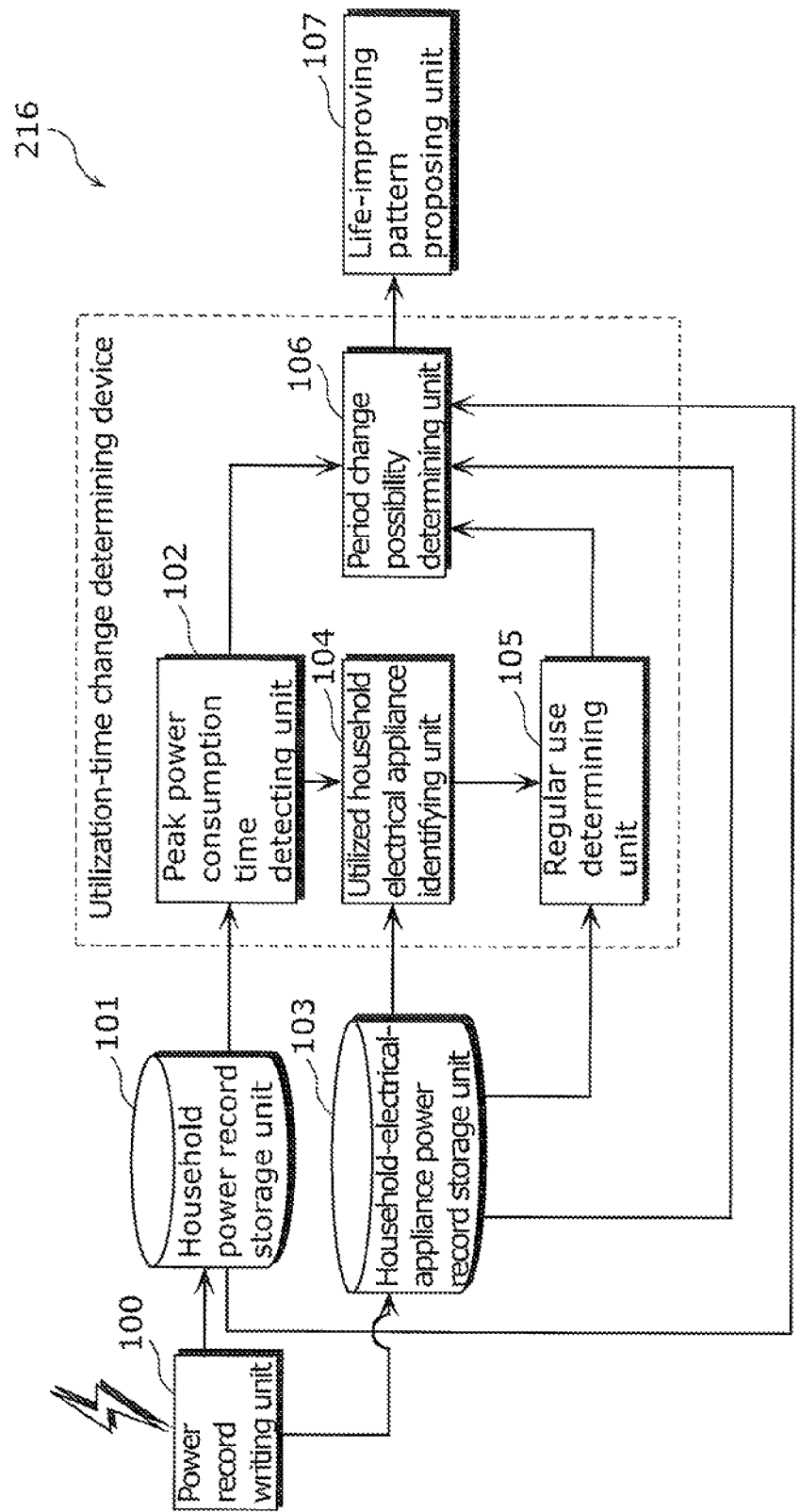
FIG. 2 is a block diagram illustrating a functional configuration of a utilization-time changing support device.

FIG. 2 is a block diagram illustrating a functional configuration of the utilization-time changing support device 216.

The utilization-time changing support device 216 includes a power record writing unit 100, a household power record storage unit 101, a peak power consumption time detecting unit 102, a household-electrical-appliance power record storage unit 103, a utilized household electrical appliance identifying unit 104, a regular use determining unit 105, a period change possibility determining unit 106, and a life-improving pattern proposing unit 107.

The household power record storage unit 101 stores records of total power consumption of an entire household. FIG. 3 illustrates an example of the records of total power consumption stored in the household power record storage unit 101. As illustrated in FIG. 3, the records of the total power consumption measured at intervals of 30 seconds are stored. For example, the table shows that the total power consumption at 6:00:00 in October 1 was 2000 W.

The peak power consumption time detecting unit 102 detects a peak power consumption time at which the total amount of power consumption is the maximum, from the records of the total power consumption stored in the household power record storage unit 101.

The household-electrical-appliance power record storage unit 103 stores records of power consumption for each household electrical appliance in the household. FIG. 4 illustrates an example of records of power consumption of each household electrical appliance that are stored in the household-electrical-appliance power record storage unit 103. As illustrated in FIG. 4, the records of the power consumption measured at intervals of 30 seconds are stored for each household electrical appliance. The table shows that a microwave oven was used during a measuring period from 6:00:00 to 6:02:30 in October 1, and, for example, the power consumption at 6:00:00 was 1480 W. Furthermore, the table shows that a toaster was used during a measuring period from 6:10:00 to 6:12:30 in October 1, and, for example, the power consumption at 6:10:00 was 1080 W.

The power record writing unit 100 receives, from the power consumption measuring device 208, information indicating the power consumption of each household electrical appliance used in the household, and writes, into the household-electrical-appliance power record storage unit 103, records in the received information as records of power consumption. Furthermore, the power record writing unit 100 receives, from the total power measuring device 204, information indicating the power consumed in the household, and writes, into the household power record storage unit 101, records in the received information as records of total power consumption.

The utilized household electrical appliance identifying unit 104 identifies a household electrical appliance used during a period (peak power consumption period) when the total amount of peak power consumption in the household is the maximum, based on records of the power consumption of each household electrical appliance stored in the household-electrical-appliance power record storage unit 103 and the information of the peak power consumption period detected by the peak power consumption time detecting unit 102.

The regular use determining unit 105 determines whether or not the household electrical appliance used during the peak power consumption period is used regularly (on a daily basis), based on the records of power consumption stored in the household-electrical-appliance power record storage unit 103.

The period change possibility determining unit 106 determines whether or not the utilization time of a household electrical appliance used during the peak power consumption period can be changed and another utilization time, based on the periodicity of the appliance and the records of the power consumption of the appliance stored in the household-electrical-appliance power record storage unit 103.

The life-improving pattern proposing unit 107 proposes how to improve a life pattern to the user, based on a result of the period change possibility determining unit 106. In other words, the life-improving pattern proposing unit 107 proposes changing a utilization time of the household electrical appliance to the utilization time determined by the period change possibility determining unit 106.

A utilization-time change determining device may be configured with the peak power consumption time detecting unit 102, the utilized household electrical appliance identifying unit 104, the regular use determining unit 105, and the period change possibility determining unit 106 included in the utilization-time changing support device 216 in FIG. 2. The utilization-time change determining device can determine (i) whether or not the utilization period of a household electrical appliance used during the peak power consumption period can be changed and (ii) another utilization period, based on records of the total power consumption or records of power consumption of each household electrical appliance. The utilization-time change determining device may include only the regular use determining unit 105 and the period change possibility determining unit 106.

Furthermore, the regular use determining unit 105 and the period change possibility determining unit 106 may be essential constituent elements of the utilization-time change determining device, among the constituent elements of the utilization-time changing support device 216 in FIG. 2, and other constituent elements may be provided outside of the utilization-time changing support device 216.

Next, a detailed configuration and operations of each module in FIG. 2 will be described.

The household power record storage unit 101 stores records of total power consumption of an entire household at predetermined sampling intervals as illustrated in FIG. 3. The total power consumption is measured by attaching the current sensor to the power distribution board 202 or the like in the household as illustrated in FIG. 1. Furthermore, the total amount of power consumption of the entire household at intervals of 30 minutes can be calculated by calculating an integrated value of the currents each of which flows during 30 minutes as illustrated in FIG. 5. The total amount of power consumption per unit of time may be calculated by the peak power consumption time detecting unit 102 using the records of the total power consumption. Alternatively, data of the total power consumption may be supplied from an electric power company with which the household is contracted. With the supply of data from the electric power company, the amount of power consumption can be obtained without attaching the current sensor to the power distribution board 202.

Figure 6:
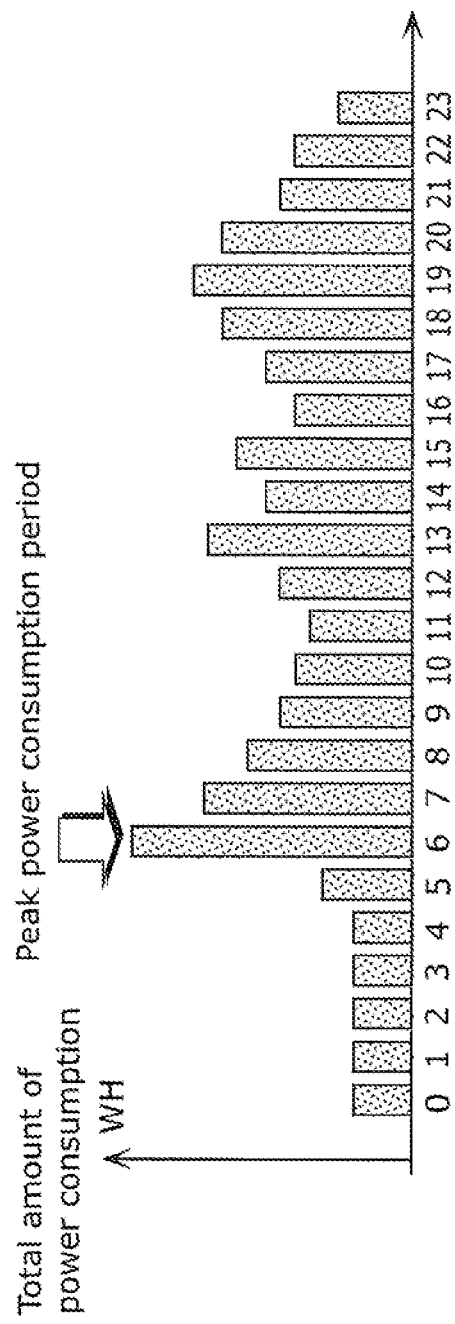
FIG. 6 is a graph representing the example of records of the total amount of power consumption.

FIG. 6 is a graph representing the records of the total amount of power consumption in FIG. 5. As illustrated in the graph of FIG. 6, the total amount of power consumption has peaked between 6 and 7 o'clock in the morning in the household.

The peak power consumption time detecting unit 102 detects a period (peak power consumption period) during the time when the total amount of peak power consumption is the maximum during a predetermined span of time (for example, one day). The example of FIG. 5 shows that the peak power consumption time detecting unit 102 detects the peak in the total amount of power consumption between 6 and 7 o'clock. A period during which the total amount of power consumption exceeds a predetermined threshold of an amount of power may be determined as the peak power consumption period.

The household-electrical-appliance power record storage unit 103 stores the records of the power consumption of each household electrical appliance that are measured at predetermined time intervals as illustrated in FIG. 4. In other words, the household-electrical-appliance power record storage unit 103 stores values of power measured by the power consumption measuring device 208 and transmitted via the wireless network as illustrated in FIG. 1. The household electrical appliances connected to the utilization-time changing support device 216 are identified by each name or model name. The user defines the names or model names when the power consumption measuring device 208 is connected. For example, when the air conditioner 212 is connected to the utilization-time changing support device 216 as a household electrical appliance, the model name is set to PP-ASA131. Furthermore, whether or not the household electrical appliance is operating can be automatically determined with predetermined input of data, such as an amount of standby power consumption of the appliance.

Figure 7:
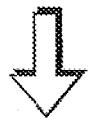
FIG. 7 is a list of household electrical appliances used during a peak power consumption period.

The utilized household electrical appliance identifying unit 104 identifies a household electrical appliance used during a peak power consumption period detected by the peak power consumption time detecting unit 102, based on a power utilization state of each household electrical appliance stored in the household-electrical-appliance power record storage unit 103, during the peak power consumption period. As illustrated in FIG. 7, the utilized household electrical appliance identifying unit 104 extracts the household electrical appliances used during the period.

The regular use determining unit 105 determines whether or not the household electrical appliance identified by the utilized household electrical appliance identifying unit 104 is regularly used during the peak power consumption period, with reference to the records of the power consumption of the appliance. The present invention has an object of improving the habit of the user to use household electrical appliances in order to effectively use power energy. Thus, the regular use determining unit 105 identifies not a household electrical appliance that is incidentally used during a peak power consumption period but a household electrical appliance that is used on a daily basis during the peak power consumption period. Accordingly, the regular use determining unit 105 determines whether or not the identified household electrical appliance is used on a daily basis, based on the periodicity of records of power consumption of the appliance.

A method of determining the periodicity will be described hereinafter. For example, a laundry machine is used between 6 and 7 o'clock that is a peak power consumption period. Here, the regular use determining unit 105 calculates the number of days the laundry machine is used between 6 and 7 o'clock with reference to records of the power consumption during the past one week. Here, a probability of using a household electrical appliance is calculated by dividing the number of days that the appliance is used during the peak power consumption period in a week, by the number of days of one week (7 days). For example, assuming that the number of days the laundry machine is used during the peak power consumption period is 5 days, the use probability of the laundry machine is $5/7=0.7$. The regular use determining unit 105 determines that the household electrical appliance is regularly used when the use probability is higher than a predetermined threshold. For example, assuming that the threshold is 0.6, since the use probability is higher than the threshold, the regular use determining unit 105 determines that the laundry machine is regularly used. When the household electrical appliance used during the peak power consumption period is a coffee maker, the regular use determining unit 105 calculates the number of days the coffee maker is used during the peak power consumption period (between 6 and 7 o'clock) in the past one week, with reference to records of power consumption of the coffee maker stored in the household-electrical-appliance power record storage unit 103. For example, when the number of days is 2 days, the use probability is $2/7=0.29$ that is smaller than the threshold of 0.6. Thus, the regular use determining unit 105 determines that the coffee maker is not regularly but incidentally used during the period. As such, the regular use determining unit 105 identifies the utilization period of a household electrical appliance, from the past records of power consumption of the household electrical appliance. Furthermore, the regular use determining unit 105 determines whether or not the household electrical appliance is regularly used (on a daily basis) during the peak power consumption period, based on the identified utilization period. Here, periodicity per week is detected. However, by separately setting a target period during which the periodicity is identified, periodicity can be extracted from different view points, such as periodicity of a household electrical appliance used every Monday and periodicity of a household electrical appliance used at the end of a month.

The period change possibility determining unit 106 determines whether or not the utilization period of a household electrical appliance determined by the regular use determining unit 105 as being used on a daily basis can be changed, based on the records of power consumption of the appliance stored in the household-electrical-appliance power record storage unit 103. For example, the period change possibility determining unit 106 determines whether or not the utilization period of a laundry machine can be changed from the morning, when the regular use determining unit 105 determines that the laundry machine is used in the morning on a daily basis. Here, the period change possibility determining unit 106 determines whether or not the utilization period of a household electrical appliance can be changed, based on information on utilization periods and frequency of using the appliance that are obtained from the past records of power consumption.

Figure 8:
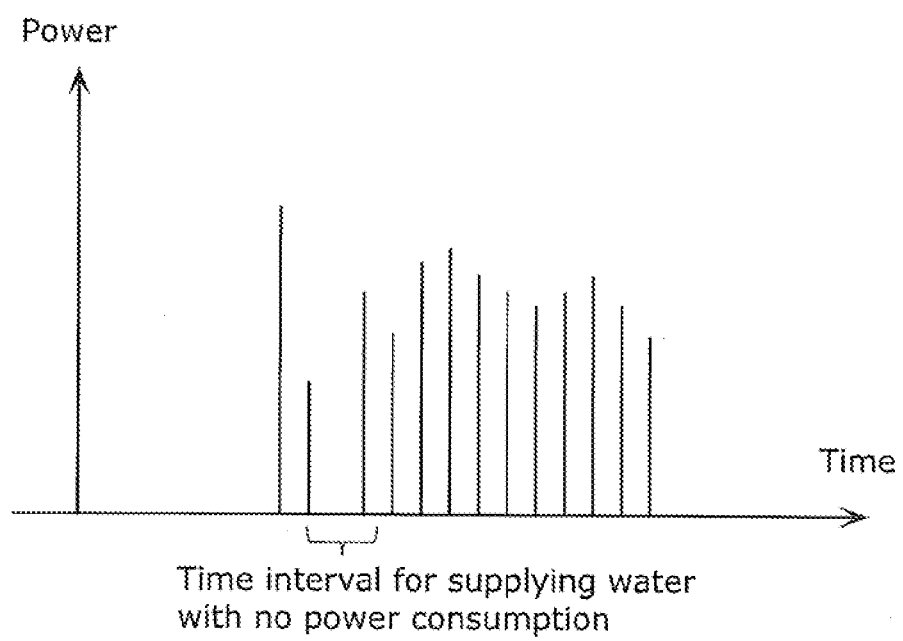
FIG. 8 is a graph representing time series records of power consumed by a laundry machine.

FIG. 8 is a graph representing time series records of power consumed by a laundry machine. When the laundry machine is operating, the motor is rotated to measure the weight of a laundry. Thus, the power is consumed. After the laundry machine is supplied with water according to the weight of the laundry, a time interval with no power consumption arises. The period change possibility determining unit 106 makes the following determination to determine that the laundry machine is operating during such a time interval. In other words, the period change possibility determining unit 106 determines that no power is temporarily consumed when a duration of power consumption equal to or lower than the standby power consumption (for example, 10 W) is shorter than a predetermined period (for example, 5 minutes). In the example of FIG. 8, the period change possibility determining unit 106 determines that the laundry machine is operating even during when it is supplied with water. As such, the period change possibility determining unit 106 determines whether or not a household electrical appliance is operating, based on not only the power consumption but also the duration of the power consumption equal to lower than the standby power consumption.

Although the laundry machine has low standby power consumption, a household electrical appliance such as a hard disc recorder has high standby power consumption. Furthermore, even when the user does not use the hard disc recorder, the hard disc recorder frequently consumes power when automatically downloading data of a program guide and others via a network. However, since the time for downloading data is short, it is necessary to appropriately set a value and a duration of the standby power consumption to detect an operating state of each household electrical appliance.

Figure 9:
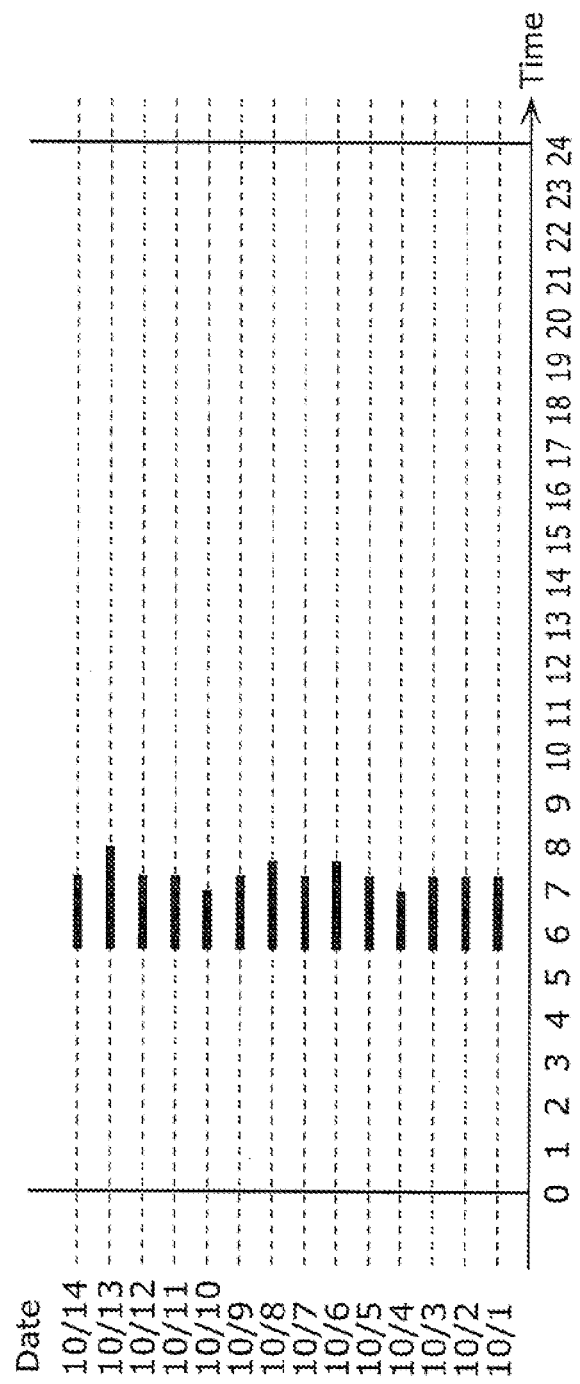
FIG. 9 illustrates an example of records of total power consumption of the laundry machine.

The period change possibility determining unit 106 calculates times at which the user operates a household electrical appliance, and records of the times at which the appliance is operating, in a predetermined span of time. For example, the period change possibility determining unit 106 calculates the records of the times at which the laundry machine was operating from October 1 to 14. For example, the result as in FIG. 9 is assumed to be obtained. FIG. 9 illustrates that the user uses the laundry machine almost every day from 6 to past 7 o'clock. The period change possibility determining unit 106 determines that it is difficult for the user who uses the laundry machine at a fixed time to change the utilization time of the laundry machine.

Figure 10:
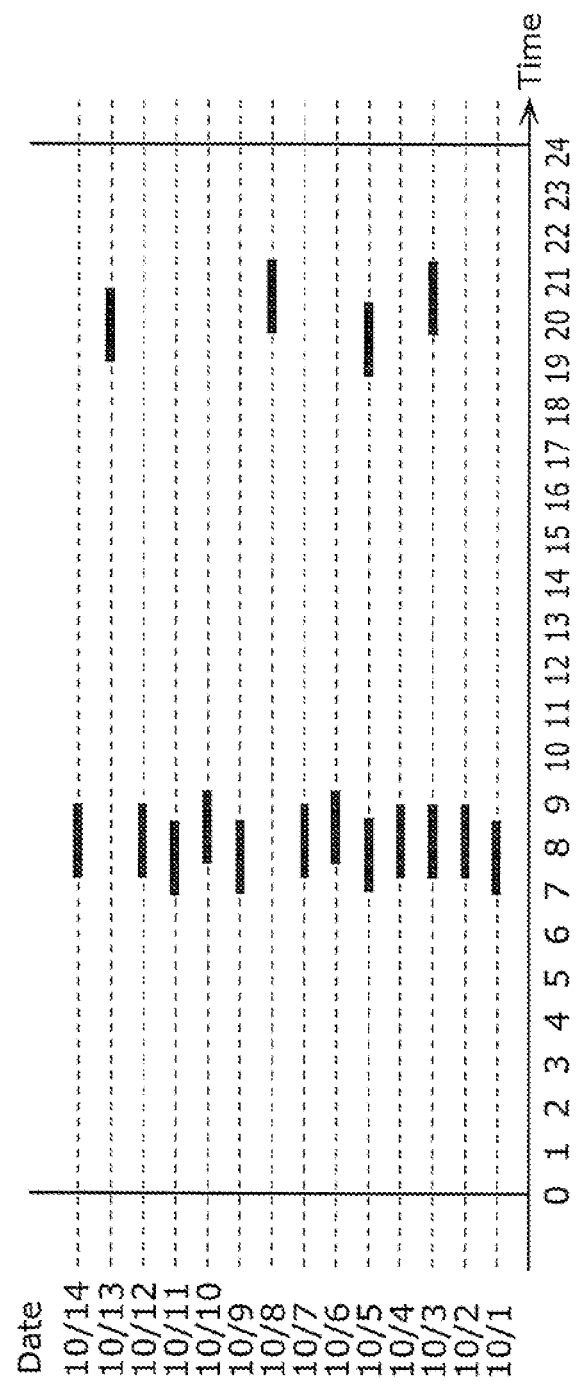
FIG. 10 illustrates an example of records of total power consumption of the laundry machine.

Similarly, the times at which the user uses the laundry machine are assumed to be obtained as different records as illustrated in FIG. 10. FIG. 10 illustrates that the user operates the laundry machine not only in the morning but also in the evening. Such a user may be interpreted as having a lifestyle of doing the laundry not only in the morning but also in the evening on a daily basis. Thus, the period change possibility determining unit 106 determines that the user can change the utilization time of the laundry machine.

Figure 11:
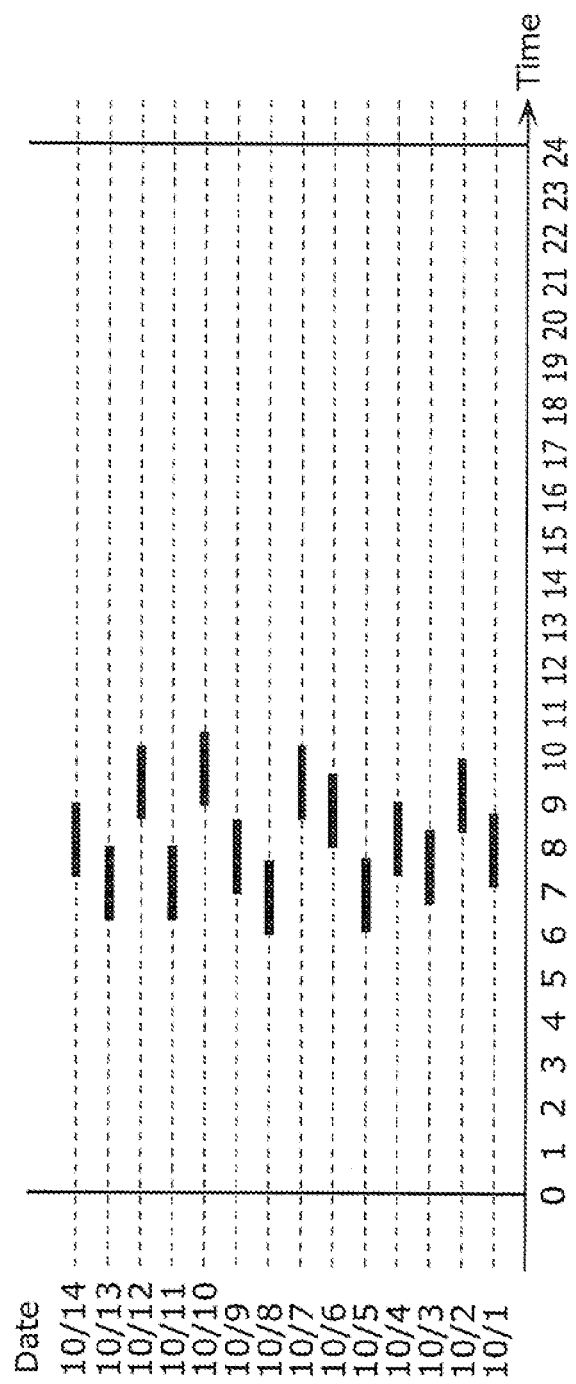
FIG. 11 illustrates an example of records of total power consumption of the laundry machine.

Furthermore, the times at which the user uses the laundry machine are assumed to be obtained as different records as illustrated in FIG. 11. FIG. 11 illustrates that the times at which the user uses the laundry machine vary even in the morning. Thus, the period change possibility determining unit 106 determines that such a user can change the utilization time of the laundry machine within the morning.

Figure 12:
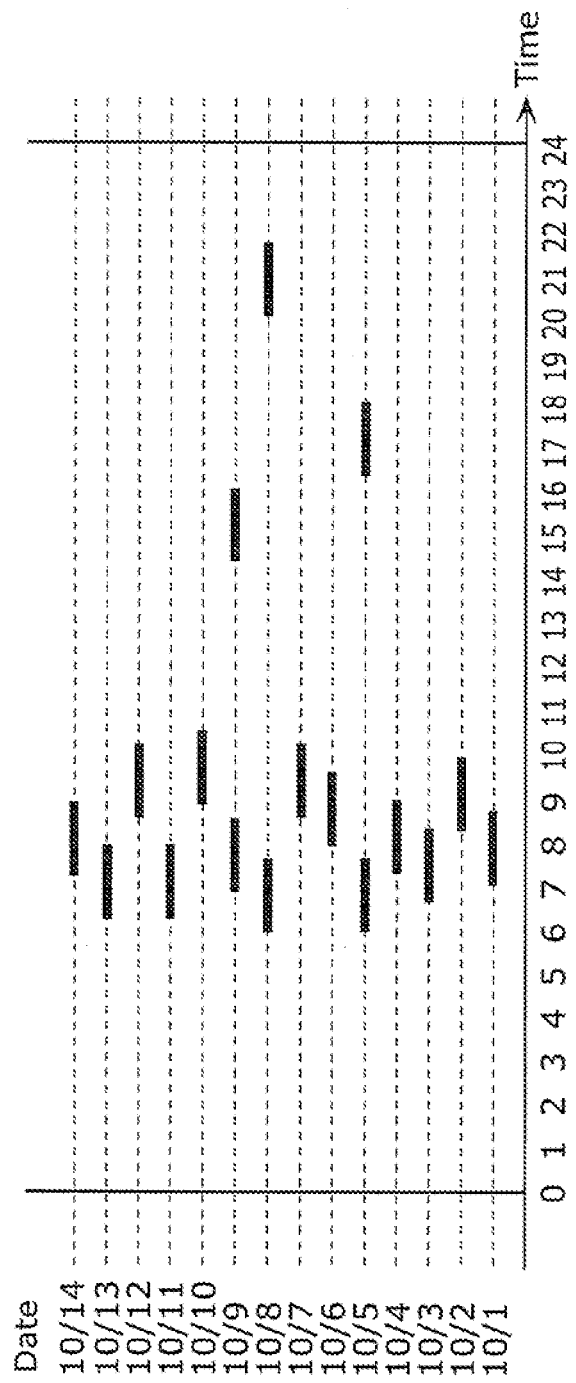
FIG. 12 illustrates an example of records of total power consumption of the laundry machine.

Furthermore, the times at which the user uses the laundry machine are assumed to be obtained as different records as illustrated in FIG. 12. FIG. 12 illustrates that the times at which the user uses the laundry machine vary in the morning as the user in FIG. 11, and that the user even does the laundry in the evening. Thus, the period change possibility determining unit 106 determines that such a user can change the utilization time of the laundry machine because the times for the laundry are not fixed.

As such, the period change possibility determining unit 106 determines whether or not the user can change the utilization time of the laundry machine, based on a degree of variation in the times at which the user does the laundry on a daily basis. In other words, the period change possibility determining unit 106 determines that the user who does the laundry at a fixed time (FIG. 9) has a difficulty in changing the utilization time of the laundry machine. Conversely, the period change possibility determining unit 106 determines that the user who does the laundry at different times (FIGS. 10 to 12) can change the utilization time of the laundry machine. The life-improving pattern proposing unit 107 proposes changing the utilization period of the laundry machine when the period change possibility determining unit 106 determines that the user can change the utilization period.

Here, the degree of variation in the utilization times is defined by, for example, variance, standard deviation, or the like of utilization start times of the laundry machine. For example, the degree of variation may be calculated by the following variance D.

$$D=(1/n)*\Sigma(xi-x')^2$$

Here, n denotes the number of data items, xi denotes utilization start times of a laundry machine, and x' denotes an average of xi. The variance D may be calculated using the utilization end times of the laundry machine.

Furthermore, the period change possibility determining unit 106 determines a time at which a laundry machine of which utilization time can be changed has been previously used, as another utilization time based on the past records of power consumption of the laundry machine. In other words, the period change possibility determining unit 106 determines a time with the past utilization record in the evening (for example, 19 o'clock) as another utilization time when the laundry machine was used in the evening except for the peak power consumption period as in the example of FIG. 10. Furthermore, the period change possibility determining unit 106 determines a time with the past utilization record except for the peak power consumption period (for example, 8 o'clock) as another utilization time when the laundry machine was used except for the peak power consumption period as in the example of FIG. 11. Furthermore, the period change possibility determining unit 106 determines a time with the past utilization record in the late morning or in the evening except for the peak power consumption period (for example, 8 o'clock or 20 o'clock) as another utilization time when the laundry machine was used in the late morning or in the evening as in the example of FIG. 12.

The period change possibility determining unit 106 determines such a period with a past record as another utilization time of the laundry machine. Here, the period change possibility determining unit 106 determines a period during which the total amount of power consumption will not peak, as another utilization time of the laundry machine. More specifically, when the period change possibility determining unit 106 determines that it is possible to change the utilization time of the laundry machine to the morning and nighttime, it is necessary to prevent the total power consumption during the periods from peaking. Thus, when the utilization time can be changed to different times, the period change possibility determining unit 106 preferentially determines a period with smaller total power consumption as another utilization time. The period change possibility determining unit 106 determines whether or not the utilization time of other household electrical appliances except for the laundry machine can be changed in the similar manner.

The life-improving pattern proposing unit 107 proposes a life-improving pattern to the user, based on a result of the determination by the period change possibility determining unit 106 on whether or not the utilization time can be changed and the other utilization time. For example, the life-improving pattern proposing unit 107 displays, on the digital television 218 and others, a message for proposing the change in the utilization time of the laundry machine to avoid the peak power together with the graph of the total power consumption of the day. As described above, the period change possibility determining unit 106 determines a time with the past utilization record of the laundry machine as another utilization time, and the life-improving pattern proposing unit 107 proposes changing the utilization time to the other utilization time. Thus, the proposal made by the life-improving pattern proposing unit 107 is a proposal in consideration of the daily life pattern of the user.

In Embodiment 1, the life-improving pattern proposing unit 107 advises the user who does the laundry both in the morning and the evening to do the laundry in the evening to avoid the peak power. Consequently, the life-improving pattern proposing unit 107 advises the user to do the laundry for two times, together in the evening. Thus, the washing time during the evening is prolonged. Thus, the life-improving pattern proposing unit 107 may notify the user of the prolonged washing time. On the other hand, the life-improving pattern proposing unit 107 advises the user who does the laundry either in the morning or in the evening during a day to do the laundry not in the morning but in the evening for one time. Thus, the washing time is not prolonged.

Furthermore, the regular use determining unit 105 calculates the use frequency of each household electrical appliance to be used during the peak power consumption period illustrated in FIG. 7, and determines whether or not the appliance is used on a daily basis. The threshold of the use probability may be different for each household electrical appliance. Furthermore, there are cases where the user who does the laundry both in the morning and the evening less frequently does the laundry during the peak power consumption period in the morning. Thus, it is preferred that the threshold of the use probability is set lower.

Figure 14:
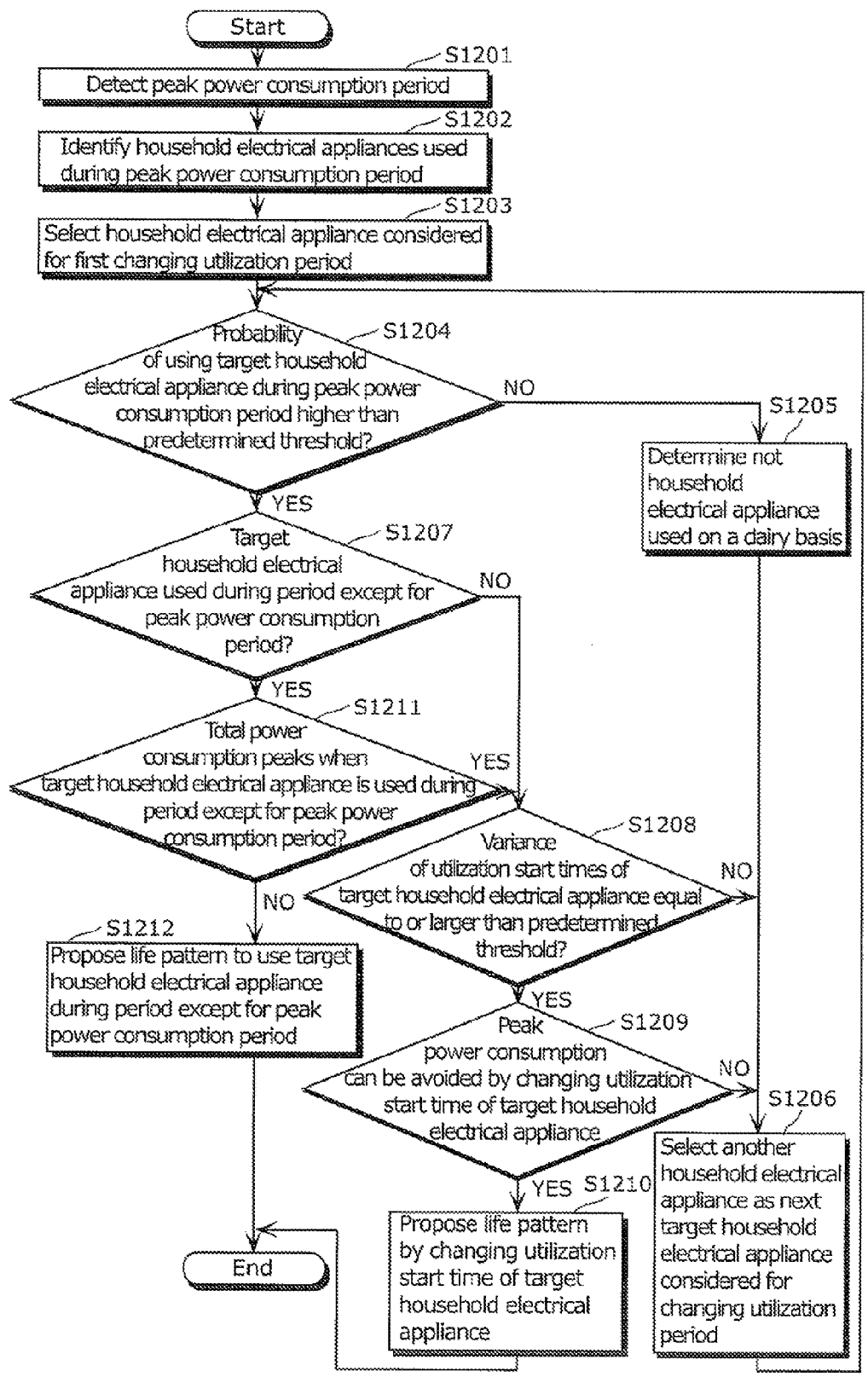
FIG. 14 is a flowchart of processes performed by the utilization-time changing support device according to Embodiment 1.

FIG. 14 is a flowchart of the processes performed by the utilization-time changing support device 216 with such a configuration.

The peak power consumption time detecting unit 102 detects a period during which the power consumption has peaked in a day (peak power consumption period), based on records of the total power consumption stored in the household power record storage unit 101 (S1201). For example, FIG. 6 is a graph representing the relationship between the total amount of power consumption and each period. In this graph, since the amount of power consumption between 6 and 7 o'clock is the largest, the period between 6 and 7 o'clock is the peak power consumption period.

The utilized household electrical appliance identifying unit 104 identifies household electrical appliances used in a household during the peak power consumption period detected by the peak power consumption time detecting unit 102, using the records of the power consumption of each of the household electrical appliances in the household stored in the household-electrical-appliance power record storage unit 103 (Step S1202). For example, when the peak power consumption period detected at Step S1201 is between 6 and 7 o'clock, the utilized household electrical appliance identifying unit 104 extracts the household electrical appliances that are used during the period as illustrated in FIG. 7.

The regular use determining unit 105 selects a household electrical appliance of which utilization period can be changed, from among the household electrical appliances extracted at Step S1202 (Step S1203). Here, the regular use determining unit 105 selects the laundry machine having the largest amount of peak power consumption, from among the household electrical appliances (air conditioner, laundry machine, electric light) having the longest utilization time in the household electrical appliances of FIG. 7, as the household electrical appliance having a possibility of changing the utilization period first.

The regular use determining unit 105 determines whether or not the household electrical appliance selected at Step S1203 is used during the peak power consumption period detected at Step S1201, on a daily basis. In other words, the regular use determining unit 105 calculates a probability of using the household electrical appliance during the peak power consumption period, and determines whether or not the probability is higher than a predetermined threshold (Step S1204). For example, when the laundry machine is selected at Step S1203, the regular use determining unit 105 calculates the probability as $5/7=0.7$ because the number of times the laundry machine is used during the peak power consumption in the past one week is 5 times, and determines that the probability is higher than a predetermined threshold of 0.6.

When the use probability is equal to or lower than the predetermined threshold (No at Step S1204), the regular use determining unit 105 determines that the target household electrical appliance is not used during the peak power consumption period on a daily basis (Step S1205).

Next, the regular use determining unit 105 selects another household electrical appliance as the next target household electrical appliance considered for changing the utilization period (Step S1206). For example, although the regular use determining unit 105 selects the laundry machine from among the household electrical appliances in FIG. 7, it selects another household electrical appliance except for the laundry machine, and the process returns to Step S1204. For example, the regular use determining unit 105 may preferentially select a household electrical appliance having a longer utilization time. Furthermore, the regular use determining unit 105 may preferentially select a household electrical appliance having a larger amount of peak power consumption.

When the use probability is higher than the predetermined threshold (Yes at Step S1204), the period change possibility determining unit 106 determines whether or not the target household electrical appliance is used during a period except for the peak power consumption period, with reference to the records stored in the household-electrical-appliance power record storage unit 103 (Step S1207). The life-improving pattern proposing unit 107 does not propose using, during another utilization period, a household electrical appliance used only during the peak power consumption period.

When the target household electrical appliance is not used during a period except for the peak power consumption period (No at Step S1207), the period change possibility determining unit 106 calculates variance (degree of variation) of utilization start times of the household electrical appliance, and determines whether or not the calculated variance is equal to or larger than a predetermined threshold (Step S1208). When the variance is equal to or larger than the predetermined threshold, the period change possibility determining unit 106 can determine that the utilization start time of the target household electrical appliance can be changed, although the appliance is used during the peak power consumption period on a daily basis. Conversely, since the variance smaller than the predetermined threshold indicates that the household electrical appliance starts to be used always at the same time, the period change possibility determining unit 106 can determine that the utilization start time of the appliance cannot be changed.

When the variance of utilization start times of the household electrical appliance is equal to or larger than the predetermined threshold (Yes at Step S1208), the period change possibility determining unit 106 determines whether or not the peak power consumption can be reduced by changing the utilization start time of the appliance (Step S1209). More specifically, the period change possibility determining unit 106 calculates the amount of power consumption of the target household electrical appliance during the peak power consumption period, with reference to the records stored in the household-electrical-appliance power record storage unit 103. Furthermore, the period change possibility determining unit 106 calculates the total amount of power consumption for each period, with reference to the records stored in the household power record storage unit 101. Thus, the household-electrical-appliance power record storage unit 103 subtracts the amount of power consumption of the target household electrical appliance during the peak power consumption period, from the total amount of power consumption during the same period. Furthermore, the household-electrical-appliance power record storage unit 103 adds the amount of power consumption of the target household electrical appliance during the peak power consumption period, to the total amount of power consumption during a period to which another utilization start time belongs. The household-electrical-appliance power record storage unit 103 calculates a new peak power consumption period from the total amount of power consumption after changing the utilization start time, and calculates the total amount of power consumption during the new peak power consumption period. When the total amount of power consumption during the peak power consumption is smaller by changing the utilization start time of the target household electrical appliance, the period change possibility determining unit 106 determines that the peak power consumption can be reduced by changing the utilization start time of the target household electrical appliance. The other utilization start time is selected from the records of utilization start times except for the peak power consumption period. For example, the other utilization start time may be the earliest one among the utilization start times except for the peak power consumption period. When the household electrical appliance has the past utilization records only during the peak power consumption period, the other utilization start time is selected from the records of utilization start times during the peak power consumption period. For example, the other utilization start time may be the temporally last one among the utilization start times during the peak power consumption period.

Figure 13:
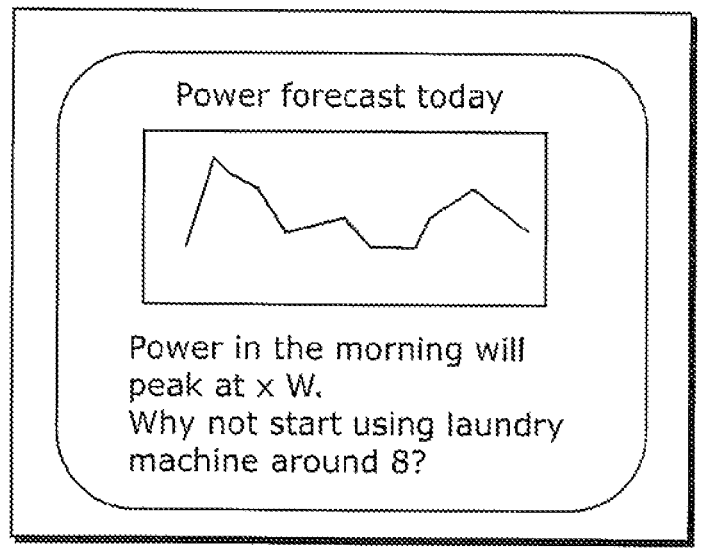
FIG. 13 illustrates an example of a presented advice.

When the period change possibility determining unit 106 determines that the peak power can be avoided by changing the utilization start time of the appliance (Yes at Step S1209), it outputs a result of the determination and information of the other utilization start time, to the life-improving pattern proposing unit 107. The life-improving pattern proposing unit 107 proposes a life pattern by changing the utilization start time of the target household electrical appliance as illustrated in FIG. 13 to the user, based on the information of the other utilization start time received from the period change possibility determining unit 106 (Step S1210).

When the target household electrical appliance is used during a period except for the peak power consumption period (Yes at Step S1207), the period change possibility determining unit 106 determines whether or not the utilization start time can be changed to a period during which the user has previously used the target household electrical appliance, except for the peak power consumption period (Step S1211). In other words, when the utilization start time is changed to a period except for the peak power consumption period, the period change possibility determining unit 106 determines whether or not the power consumption will again peak during a period to which another utilization start time belongs, in the similar manner at Step S1209.

When the total power consumption peaks during the period to which the other utilization start time belongs (Yes at Step S1211), the processes proceed to Step S1208, and the period change possibility determining unit 106 determines whether or not the utilization start time of the target household electrical appliance can be changed.

When the total power consumption does not peak during the period to which the other utilization start time belongs (No at Step S1211), the target household electrical appliance is used during a period except for the peak power consumption period, and the total power consumption will not peak even when the utilization start time is changed to the period. Thus, the period change possibility determining unit 106 outputs a result of the determination at Step S1211 and information of the other utilization start time, to the life-improving pattern proposing unit 107. The life-improving pattern proposing unit 107 proposes a life pattern by changing the utilization start time of the target household electrical appliance as illustrated in FIG. 13 to the user, based on the information of the other utilization start time received from the period change possibility determining unit 106 (Step S1212).

As such, the utilization-time changing support device according to Embodiment 1 identified the household electrical appliance used during the peak power consumption period, and calculates the degree of variation (variance) in the utilization start times of the household electrical appliance. Accordingly, the utilization-time changing support device calculates a value representing temporal flexibility for using a household electrical appliance in a daily life so that it can propose improving the life pattern to the user to prevent the power consumption from peaking during a predetermined period.

In Embodiment 1, the utilization-time changing support device determines whether or not the utilization period of a household electrical appliance regularly used during the peak power consumption period can be changed, based on records of the power consumption of the appliance. Accordingly, the utilization-time changing support device can support change in the utilization period of a household electrical appliance used on a daily basis, by prioritizing such an appliance. Furthermore, the utilization-time changing support device can support change in the utilization period of only a household electrical appliance of which utilization period can be changed, by determining whether or not the utilization period can be changed and the other utilization period. Accordingly, the utilization-time changing support device can appropriately support change in the utilization period of the household electrical appliance.

Embodiment 1 describes a proposal of changing the utilization period of a household electrical appliance used on a daily basis, based on the past records of the power consumption in order to reduce the peak power consumption of the entire household. The application of Embodiment 1 is to quantify the change in the daily life and select a household electrical appliance of which utilization period is to be changed, with reference to the quantified value.

(Modification of Embodiment 1)

In Embodiment 1, the utilization-time changing support device extracts a period during which the total power consumption in a household peaks, and identifies a household electrical appliance used during the peak power consumption period from the records of the measured power consumption of household electrical appliances. Furthermore, in order to support change in a period during which the identified household electrical appliance is used, the utilization-time changing support device proposes to the user another period during which the appliance can be used, based on the past records of the power consumption of the appliance.

However, uses of the household electrical appliances in a household vary. The utilization-time changing support device can control an amount of power consumption during a predetermined period in a daily life of the user, for example, by changing the utilization start time of the laundry machine as described in Embodiment 1. On the other hand, it is difficult to change the utilization start time of a household electrical appliance such as a television, because the utilization start times vary according to the interest of the user in programs. However, it is possible to change the utilization start time of a dishwasher (dish washer and dryer) and others as the laundry machine. Furthermore, the operation processes of the dishwasher include two processes of washing dishes and drying the dishes after the washing. Thus, when the utilization time of the dishwasher overlaps the peak power consumption period, the dishwasher only washes dishes although it starts to be operated at the same time as usual. Here, there is a method of stopping the operation of the dishwasher during the time when the power consumption in the household peaks and starting to operating it again after the peak power consumption in the household.

Since the utilization methods vary for each household electrical appliance, preparing knowledge on the change in the utilization methods in advance makes it possible to propose a flexible life-improving pattern to the user.

Figure 15:
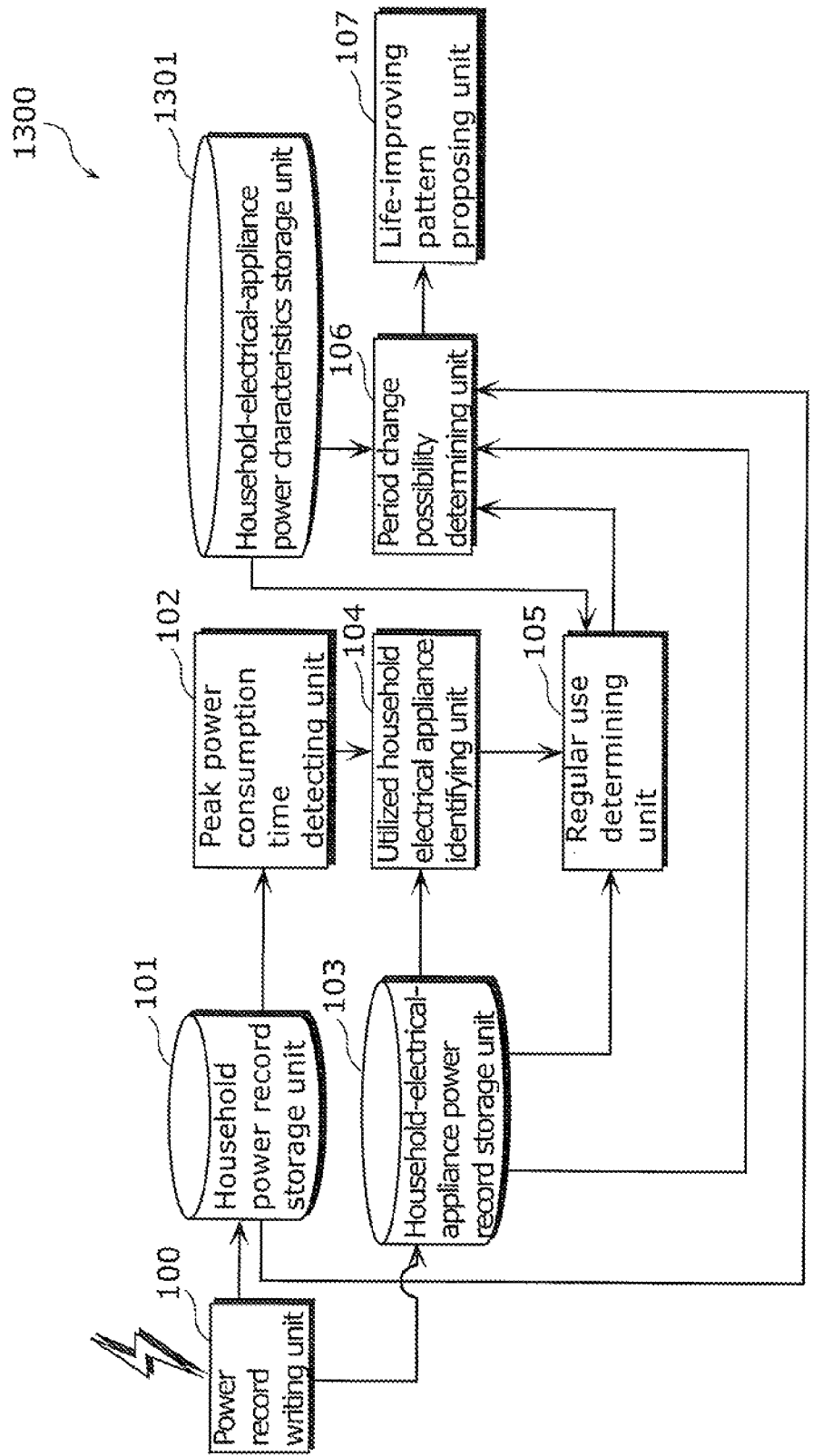
FIG. 15 is a block diagram illustrating a functional configuration of a utilization-time changing support device according to a modification of Embodiment 1.

FIG. 15 illustrates a hardware construction of a utilization-time changing support device according to a modification of Embodiment 1.

The utilization-time changing support device 1300 includes a household-electrical-appliance power characteristics storage unit 1301 in addition to the configuration of the utilization-time changing support device 216 according to Embodiment 1 in FIG. 2. The household-electrical-appliance power characteristics storage unit 1301 stores utilization method changing information that is information for changing a utilization method for each household electrical appliance.

FIG. 16 illustrates an example of the utilization method changing information stored in the household-electrical-appliance power characteristics storage unit 1301.

The utilization method changing information includes, for each household electrical appliance, (i) information indicating whether or not a utilization period can be changed, (ii) information indicating whether or not the total power consumption can be reduced, (iii) information indicating whether or not the utilization period can be shortened, and (iv) information indicating whether or not the processes can be divided. In FIG. 16, "Yes" indicates that the change is possible, and "No" indicates that the change is impossible. For example, the utilization period of the laundry machine can be changed as described in Embodiment 1. Furthermore, the user can manually change a washing period, the number of rinsing, and a drying period. However, the user has a difficulty in changing the amount of power consumption. Furthermore, the washing process and the drying process do not have to be sequentially performed. Thus, the utilization method changing information indicates regarding the laundry machine that the utilization period can be changed and the processes can be divided, but the total power consumption cannot be reduced and the utilization period cannot be shortened.

Furthermore, the utilization method changing information indicates that processes for an iron cannot be divided, and has a difficulty in reducing the total power consumption. This is because the iron is a device that only smoothes down the creases of washed clothes. However, the utilization method changing information indicates that the user can control changing the utilization period of the iron and shortening the utilization period of the iron to some extent. Furthermore, the user changes the target temperature of the air conditioner, so that the operation of the compressor can be controlled. Thus, the utilization method changing information indicates that the total power consumption of the air conditioner can be controlled to some extent. Thus, information on the assumed use is stored for each household electrical appliance in FIG. 16.

Furthermore, the household-electrical-appliance power characteristics storage unit 1301 stores process dividing pattern information that is information indicating processes of each household electrical appliance. FIG. 17 illustrates an example of the process dividing pattern information. The process dividing pattern information indicates the power consumption and the consumption period of each household electrical appliance in each process. For example, the information indicates that the processes of the laundry machine can be divided into a first process (washing process) and a second process (drying process). Furthermore, the information indicates that the laundry machine in the first process has the power consumption of 400W and the consumption period of 20 to 30 minutes. Furthermore, the information indicates that the laundry machine in the second process has the power consumption of 700W and the consumption period of 40 to 50 minutes.

The time-series information of the power consumption of the laundry machine as illustrated in FIG. 18 can be obtained from sequential processes of washing and drying after the washing by the laundry machine. As such, one household electrical appliance implements a plurality of processes in recent years in order to save the trouble of the user. Furthermore, in many cases, it is possible to determine from records of power consumption whether or not the user uses the plurality of processes in the daily life. In the example of FIG. 18, although power is basically consumed for driving a motor for washing when the clothes are washed, power is consumed for generating warm air with a heater when the clothes are dried at the same time when the motor is driven. Thus, the power consumption in the drying process is higher than the power consumption in the washing process. Accordingly, it is possible to determine from records of power consumption of the laundry machine whether or not the user uses the drying function.

Even when the user has a household electrical appliance with a plurality of processes, the user does not always uses the functions. For example, even when a laundry machine has the drying function, there are users who use the drying function only during the rainy season or users who do not use it at all. Furthermore, even when an automatic rice cooker has a warming function, there are users who do not use the function. Here, comparing the time-series information of power consumption with the process dividing pattern information in FIG. 17 makes it possible to extract not only whether or not the user uses the household electrical appliance but also a function the user uses in detail.

As such, it is possible to determine the usage of a household electrical appliance based on the record of the power consumption and the process dividing pattern information. Accordingly, it is possible to propose how to improve the lifestyle to the user, using a result of the determination.

In Embodiment 1, the utilization-time changing support device extracts a peak power consumption period in a household, identifies a household electrical appliance used during the peak power consumption period, and proposes changing the utilization period of the appliance to the user, so that the peak amount of the power consumption in the household can be controlled. In the modification of Embodiment 1, it is possible to propose improving the lifestyle by decreasing the peak amount of the power consumption, using the utilization method changing information as illustrated in FIG. 16.

In other words, the regular use determining unit 105 determines whether only a household electrical appliance indicated by the utilization method changing information that the utilization period can be changed is regularly used, in addition to the processes described in Embodiment 1. In the example of the utilization method changing information in FIG. 16, an appliance that is used during the peak power consumption period is determined as a target appliance, from among the laundry machine, the iron, the automatic rice cooker, and the dishwasher. In other words, even when the air conditioner or the television is used during the peak power consumption period, the utilization period of either of the devices cannot be changed. Thus, the regular use determining unit 105 does not determine the periodicity of these devices. Similarly, the period change possibility determining unit 106 determines whether only a household electrical appliance indicated by the utilization method changing information that the utilization period can be changed is regularly used, in addition to the processes described in Embodiment 1. Thus, the processing by the regular use determining unit 105 and the period change possibility determining unit 106 can be reduced.

Furthermore, the period change possibility determining unit 106 may determine whether or not the utilization period of a household electrical appliance of which utilization period can be changed and of which processes can be divided can be changed per process. Accordingly, the household electrical appliance can be operated by avoiding the peak power consumption period without changing the utilization start time to a large degree. For example, since the laundry machine consumes a large amount of power for drying, although the washing process is performed as usual, it is possible to shift the utilization start time of the drying process to avoid the peak power consumption period. Furthermore, since the dishwasher consumes a larger amount of power in the washing process than that in the drying process, starting the washing process earlier than the peak power consumption period makes it possible to reduce the power consumption during the peak power consumption period.

The modification of Embodiment 1 describes proposing, per process, change in the utilization time of a household electrical appliance of which processes can be divided. Furthermore, the appliances of each of which processes can be divided have different time limits between the first process and the next process in general. For example, an automatic rice cooker has a warming process after a rice cooking process. Unless an interval between the processes is approximately 30 minutes at a maximum, the rice will not taste good. On the other hand, when an interval between the washing process and the drying process of a laundry machine is longer than 1 hour, the washed clothes obviously have creases because they are kept in the washing tank. Thus, it is necessary to maintain the interval within 1 hour. However, there is no problem of having an interval of approximately two hours between the drying process and the washing process of the dishwasher. Therefore, the restriction on an interval between processes differs in each household electrical appliance. Thus, defining the time limit for an interval between processes according to the characteristics of each of the household electrical appliances in FIG. 16 and proposing change in the utilization time within the time limit makes it possible to propose a different lifestyle without interfering with one's daily life. Furthermore, the utilization-time changing support device proposes, to the user, washing dishes after dinner using a dishwasher first so as to easily clean the dishes, and then performing the costly drying process using the midnight power. These processes will help the user to suppress the power charges while maintaining his/her daily life.

(Embodiment 2)

In Embodiment 1, the utilization-time changing support device proposes improving the lifestyle by changing a utilization period of each household electrical appliance. However, in many cases, a household electrical appliance used in a household generally works in conjunction with other household electrical appliances. Thus, there are cases where the utilization periods of the other household electrical appliances are changed according to the change in the utilization period of one household electrical appliance. Here, Embodiment 2 describes a power measuring system that holds in advance information on a group of household electrical appliances that are probably used in conjunction with each other, and proposes changing the utilization period per group. In Embodiment 2, the same reference numerals are used for the constituent elements of Embodiment 1, and the description thereof will be omitted.

The configuration of the power measuring system in Embodiment 2 is the same as that of the power measuring system 200 according to Embodiment 1 in FIG. 1. However, the configuration of a utilization-time changing support device differs from that of Embodiment 1.

Figure 19:
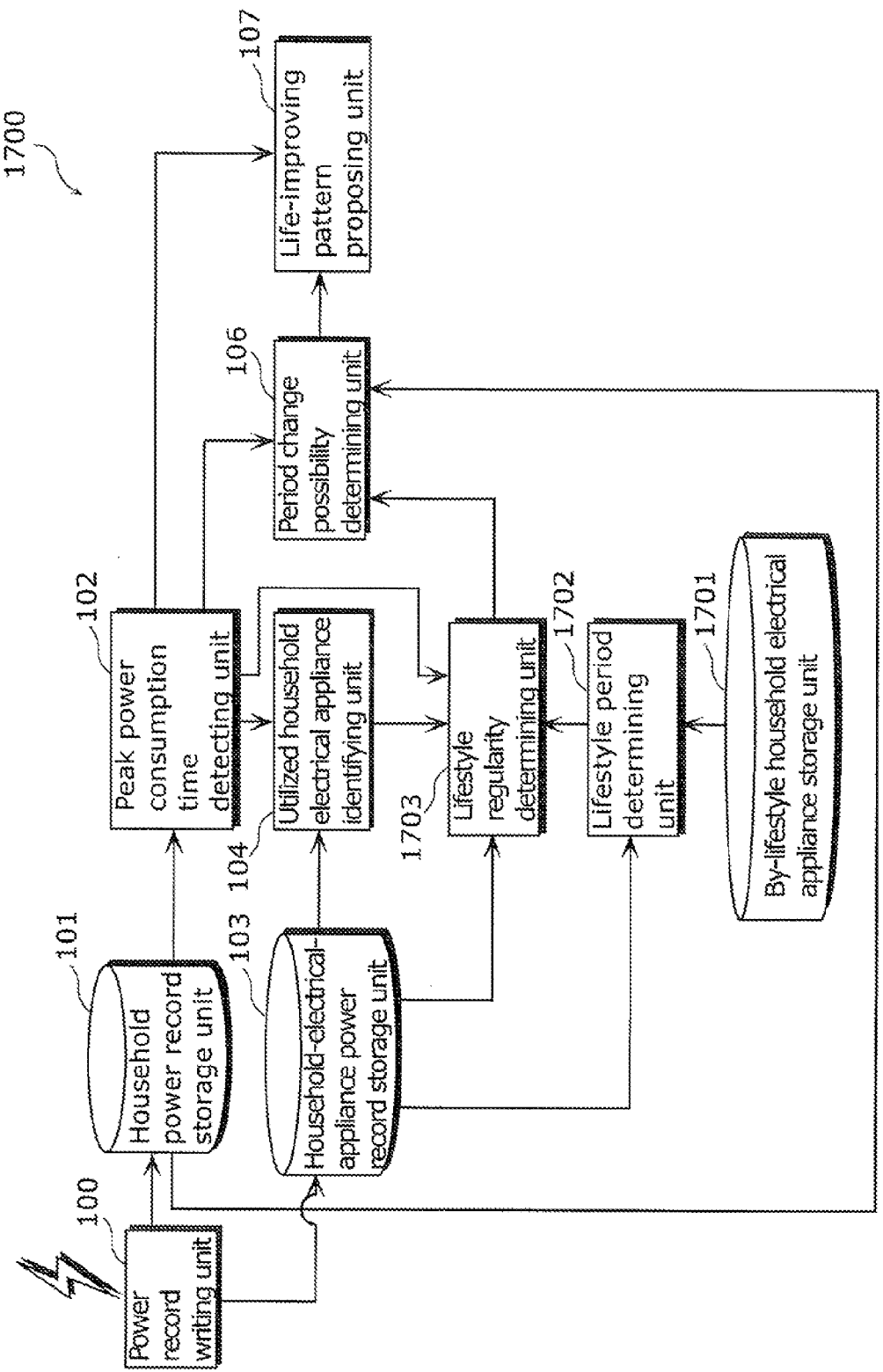
FIG. 19 is a block diagram illustrating a functional configuration of a utilization-time changing support device according to Embodiment 2.

FIG. 19 is a block diagram illustrating a functional configuration of a utilization-time changing support device 1700 according to Embodiment 2.

The utilization-time changing support device 1700 includes a by-lifestyle household electrical appliance storage unit 1701 and a lifestyle period determining unit 1702, and a lifestyle regularity determining unit 1703, in addition to the configuration of the utilization-time changing support device 216 according to Embodiment 1 in FIG. 2.

The by-lifestyle household electrical appliance storage unit 1701 stores a household electrical appliance that is probably used in conjunction with other appliances, for each lifestyle. The lifestyle period determining unit 1702 determines a period of each lifestyle of the user, with reference to records of power consumption of the household electrical appliances stored in the household-electrical-appliance power record storage unit 103 and the information of the group of household electrical appliances stored for each lifestyle in the by-lifestyle household electrical appliance storage unit 1701. The lifestyle regularity determining unit 1703 determines whether or not (i) the household electrical appliance identified by the utilized household electrical appliance identifying unit 104 is associated with the lifestyle extracted by the lifestyle period determining unit 1702, and (ii) the lifestyle is regular.

Hereinafter, operations of the utilization-time changing support device 1700 will be described with a main focus on the by-lifestyle household electrical appliance storage unit 1701 and the lifestyle period determining unit 1702 that are newly added to the configuration according to Embodiment 1.

The by-lifestyle household electrical appliance storage unit 1701 stores correspondence between each household electrical appliance to be used in dining, taking a bath, waking up, going to bed, and others and operations of the appliance, in the daily life of the user. In Embodiment 2, the dining, taking a bath, waking up, going to bed, and others are regarded as the lifestyle of the user, and household electrical appliances to be used in the lifestyle are identified. For example, when a meal is prepared, the household electrical appliances to be used can be identified to some extent, such as an Induction Heating (IH) stove, an automatic rice cooker, a microwave oven, and a toaster. In particular, the time for meal preparation at each household can be estimated with reference to the time-series information of power consumption of household electrical appliances for cooking. In another example, it is possible to estimate a bathing time in a household, with reference to records of power consumption of a water heater, records of power consumption of an electric light in a bathroom, and records of power consumption of a laundry machine when the user does the laundry by recycling the remaining bath water. Furthermore, it is possible to estimate a wake-up time in a household, with reference to records of power consumption of a room light, records of power consumption of an air conditioning appliance, such as an air conditioner, and records of power consumption of a television if the user turns ON the television upon waking up. As such, the lifestyle of the user in a household can be identified with a combination of household electrical appliances with each utilization start time, utilization end time, and utilization time. In Embodiment 2, the relationship between the combination of household electrical appliances and the lifestyle is stored as correspondence information in the by-lifestyle household electrical appliance storage unit 1701 as illustrated in FIG. 20.

The correspondence information in FIG. 20 includes, for each lifestyle, household electrical appliances (target household electrical appliances) to be used in the lifestyle, operations of the household electrical appliances for detecting start times of the lifestyle, and operations of the household electrical appliances for detecting end times of the lifestyle. For example, the meal preparation can be determined with reference to records of power consumption of household electrical appliances, such as an IH stove, an automatic rice cooker, a microwave oven, a toaster, and a dishwasher. Furthermore, the information shows that a start time of the meal preparation can be determined with reference to the utilization start times of the IH stove, the microwave oven, and the toaster, and the start time of a rice cooking process by the automatic rice cooker. Actually, the earliest utilization start time among these utilization start times is determined as the start time of the meal preparation. Furthermore, the information shows that the end time of the meal preparation can be determined with reference to the utilization end times of the IH stove, the start time of the warming process by the automatic rice cooker, the end time of the rice cooking process by the automatic rice cooker, the utilization start time of the dishwasher, and the utilization end time of the microwave oven. Actually, the last time among these times is determined as the end time of the meal preparation.

The lifestyle period determining unit 1702 determines a period of a lifestyle in a household, with reference to the correspondence information stored in the by-lifestyle household electrical appliance storage unit 1701 and the records of power consumption of the household electrical appliances stored in the household-electrical-appliance power record storage unit 103. In other words, the lifestyle period determining unit 1702 detects the utilization time of the target household electrical appliance for each lifestyle during a period in which the lifestyle probably takes place. For example, when three meals per day are eaten in a household, the meal is prepared for each period in the morning, around noon, and in the evening. Furthermore, a predetermined period of each meal is set in advance, and the lifestyle of the user is identified according to a use state of each household electrical appliance within the set period. The period of each lifestyle is stored in the by-lifestyle household electrical appliance storage unit 1701, for example, as illustrated in FIG. 21.

Figure 22:
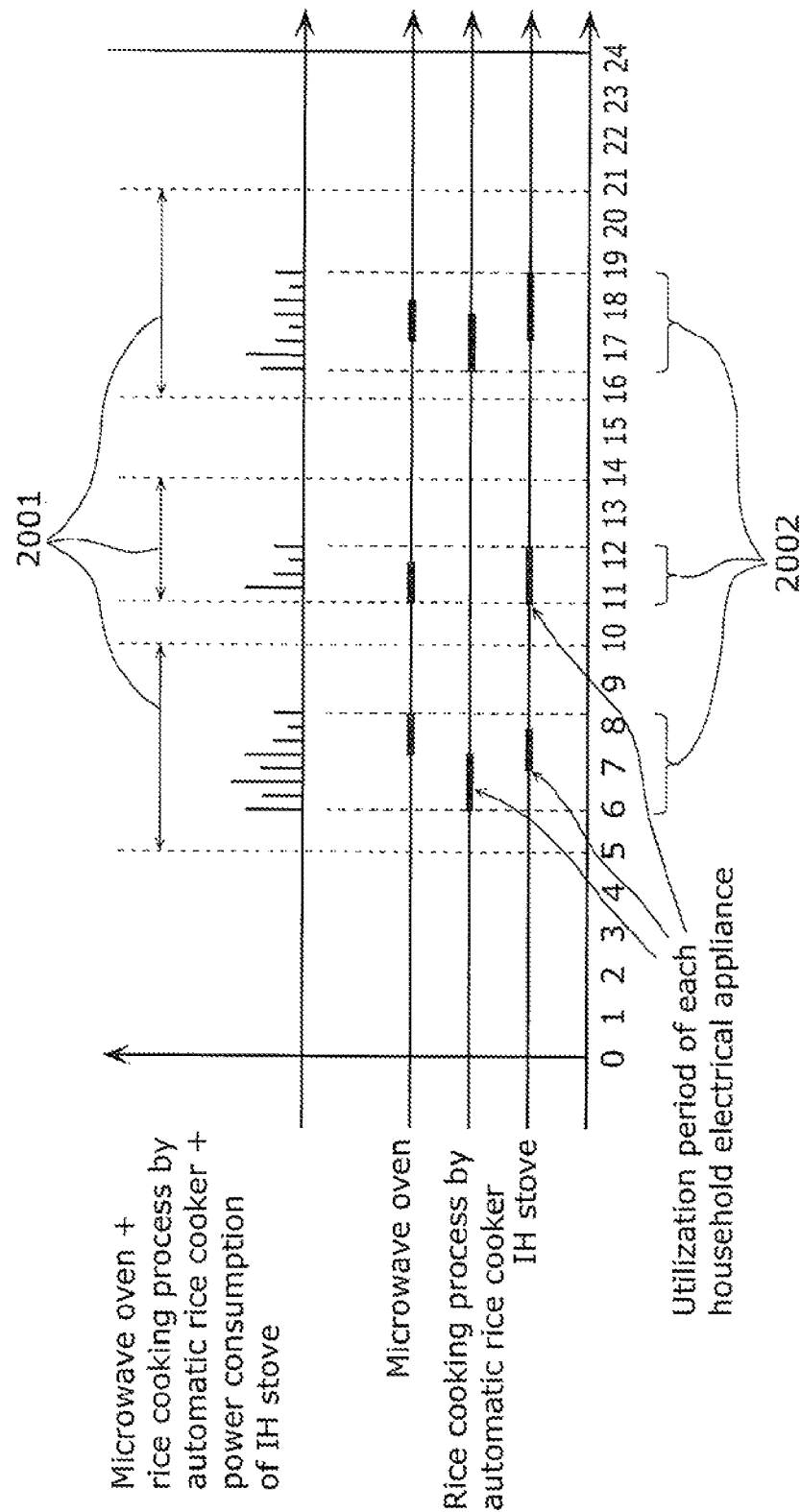
FIG. 22 illustrates a process for identifying periods for meal preparation as a lifestyle.

Next, a process of determining periods of each lifestyle will be more specifically described. FIG. 22 illustrates an example of a process for identifying periods for meal preparation as a lifestyle. Here, each of the periods for meal preparation is determined with reference to the rice cooking process of a microwave oven and an automatic rice cooker and records of power consumption of an IH stove. As illustrated in FIG. 22, the lifestyle period determining unit 1702 sets each candidate period 2001 for meal preparation, based on the information in FIG. 21. For example, the candidate period 2001 for preparing breakfast is between 5 to 10 o'clock. Then, the lifestyle period determining unit 1702 extracts a time during which the rice cooking process of the automatic rice cooker is performed and the microwave oven and the IH stove are used within each of the candidate periods 2001, based on the records of the power consumption stored in the household-electrical-appliance power record storage unit 103. Based on such time information, the lifestyle period determining unit 1702 determines a time for meal preparation in each household. In other words, the lifestyle period determining unit 1702 determines, for each of the candidate periods 2001 as a time to start preparing a meal, the earliest time from among each of (i) the utilization start times of the microwave oven, (ii) the start times of the rice cooking process by the automatic rice cooker, and (iii) utilization start times of the IH stove. Furthermore, the lifestyle period determining unit 1702 determines, for each of the candidate periods 2001 as a time to finish preparing the meal, the last one from among each of (i) the utilization end times of the microwave oven, (ii)

the end times of the rice cooking process by the automatic rice cooker, and (iii) utilization end times of the IH stove. Accordingly, periods for meal preparation 2002 are determined.

In the example of FIG. 22, the lifestyle period determining unit 1702 detects times for meal preparation in a day. Embodiment 2 proposes a life-improving pattern (changing a period of a lifestyle) using periods of each lifestyle in a longer span of time (such as a span of one week, two weeks, etc.). In Embodiment 2, upon calculating periods of each lifestyle in the aforementioned method, the periods are used similarly as the utilization periods of the household electrical appliance in Embodiment 1. Accordingly, the periodicity of the periods of the lifestyle and whether or not the periods can be changed are determined. Thus, it is possible to propose a life-improving pattern. Other processes except the determination are the same as those in Embodiment 1. Thus, the procedure of the processes performed by the utilization-time changing support device 1700 will be briefly described.

The peak power consumption time detecting unit 102 detects a period during which the amount of power consumption becomes the largest in one day with reference to the graph in FIG. 6. Furthermore, the utilized household electrical appliance identifying unit 104 identifies household electrical appliances used during the peak power consumption period detected by the peak power consumption time detecting unit 102. FIG. 7 is a list of the identified household electrical appliances.

Next, operations of the lifestyle regularity determining unit 1703 will be described. The lifestyle regularity determining unit 1703 identifies a period of a lifestyle included in a peak power consumption period, and determines whether or not the identified lifestyle is regular. For example, assume a case where the IH stove is used during the peak power consumption period, and the peak power consumption period includes a meal preparation period during which the IH stove determined by the lifestyle period determining unit 1702 is used. In this case, the lifestyle regularity determining unit 1703 determines whether or not the peak power consumption period includes the meal preparation period every day.

Figure 23:
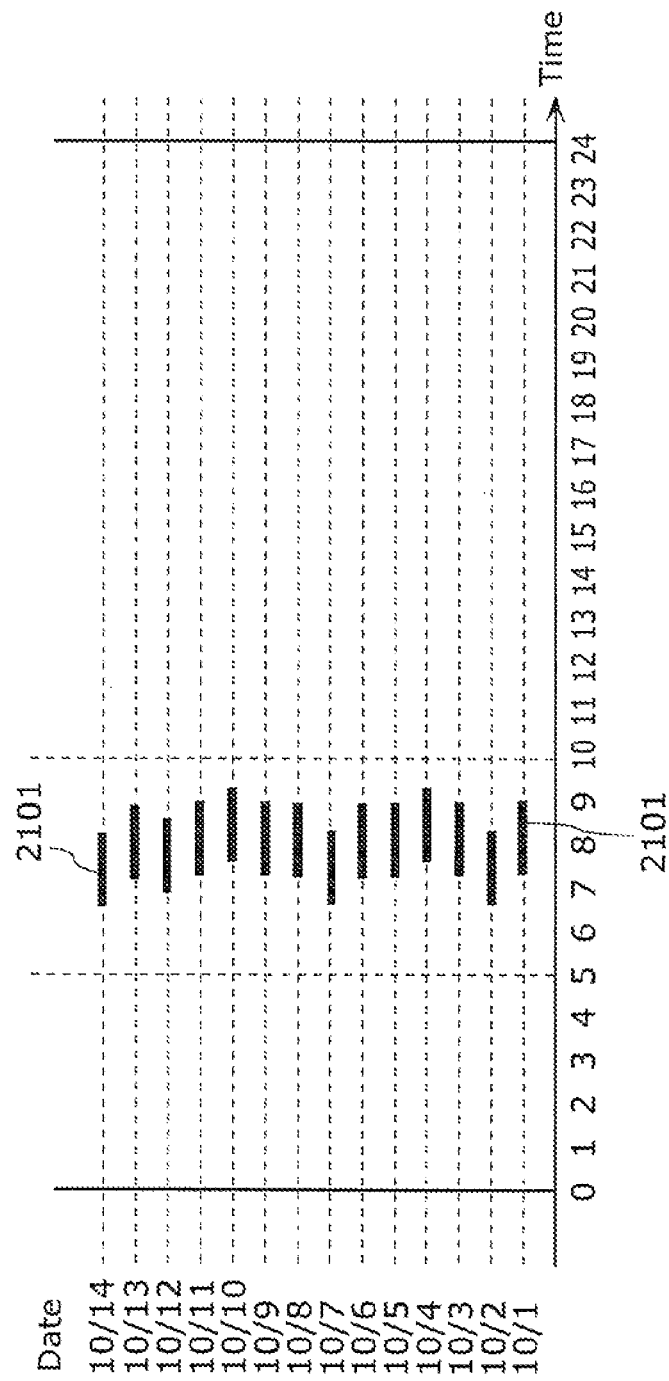
FIG. 23 illustrates an example of records of meal preparation times.

FIG. 23 illustrates an example of records of meal preparation times for two weeks when the peak power consumption period is between 7 to 8 o'clock. Meal preparation periods 2101 slightly vary between 7 to 9 o'clock. The lifestyle regularity determining unit 1703 determines that the lifestyle of a household with such large variation in the meal preparation periods 2101 is not regular. When the lifestyle regularity determining unit 1703 determines that the lifestyle is not regular, the period change possibility determining unit 106 determines that a period of the lifestyle can be changed.

Figure 24:
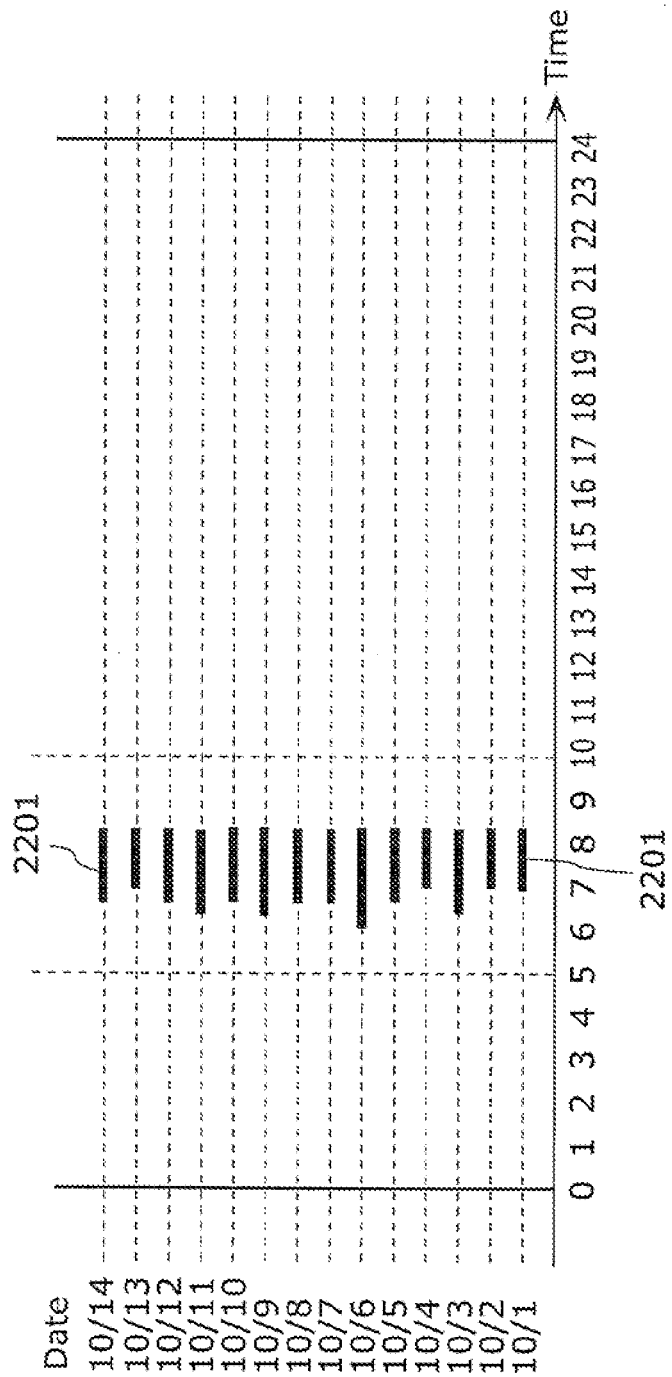
FIG. 24 illustrates an example of records of meal preparation times.

On the other hand, assume a case where meal preparation periods 2201 always end around 8:30 as illustrated in FIG. 24. Since this household has a predetermined end time for the meal preparation, the variation between the meal preparation periods 2201 is small. Thus, the lifestyle regularity determining unit 1703 determines that the lifestyle is regular. When the lifestyle regularity determining unit 1703 determines that the lifestyle is regular, the period change possibility determining unit 106 determines that a period of the lifestyle cannot be changed.

The lifestyle regularity determining unit 1703 calculates, for example, variance of the end times in a period, as a degree of variation in the period. The lifestyle regularity determining unit 1703 determines that the lifestyle is not regular when the variance is larger than a predetermined threshold. Accordingly, when determining that a period of the lifestyle can be changed, the period change possibility determining unit 106 determines another period of the lifestyle. The period change possibility determining unit 106 selects another period from among the past periods of the lifestyle. For example, the period change possibility determining unit 106 may determine a previous period that did not overlap the peak power consumption period as the other period of the lifestyle. Furthermore, without such a previous period, the period change possibility determining unit 106 may determine a period with the shortest overlap with the peak power consumption period or a period during which the peak power consumption can be reduced at a maximum, as the other period of the lifestyle. Furthermore, the period change possibility determining unit 106 may determine a proposal for uniformly starting periods of the lifestyle earlier, instead of the other period of the lifestyle. The lifestyle regularity determining unit 1703 outputs the determined period together with the result of the determination, to the life-improving pattern proposing unit 107.

Figure 25:
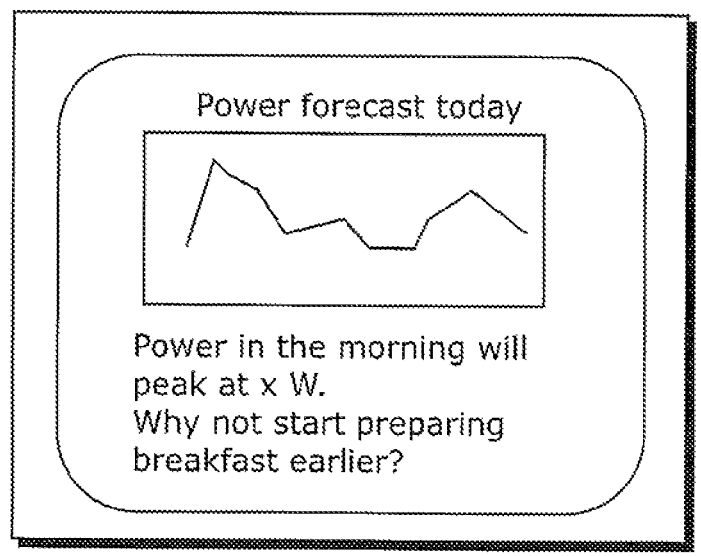
FIG. 25 illustrates an example of a presented advice.

The life-improving pattern proposing unit 107 proposes changing a period of a life pattern that is determined by the period change possibility determining unit 106 to be changeable. For example, the life-improving pattern proposing unit 107 displays, on the digital television 218 and others, a proposal for starting a preparation time for breakfast earlier, together with the graph of the total power consumption of the day as illustrated in FIG. 25.

Similarly, the period change possibility determining unit 106 determines whether or not a period of other lifestyles such as "taking a bath" and "watching movies" as in FIG. 20 can be changed based on the degree of variation in the period. For example, in many cases, it is highly possible that the lifestyle of "watching movies" that is rarely performed in a predetermined time is changed.

Figure 26:
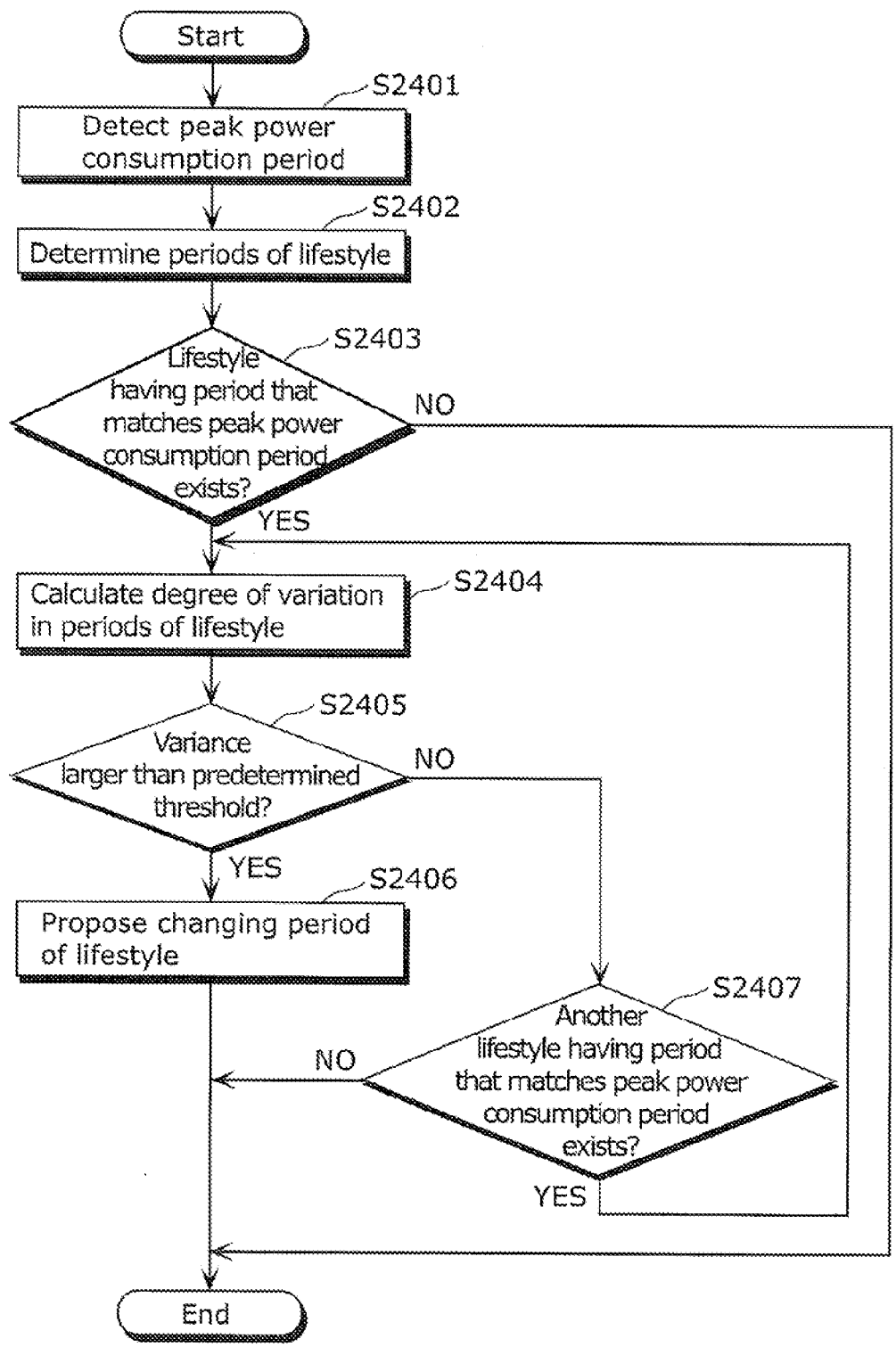
FIG. 26 is a flowchart of processes performed by the utilization-time changing support device according to Embodiment 2.

In summary, FIG. 26 is a flowchart of the processes of the utilization-time changing support device 1700 with such a configuration.

The peak power consumption time detecting unit 102 detects a peak power consumption period, based on records of total power consumption in one day and data stored in the household power record storage unit 101 (S2401).

The utilized household electrical appliance identifying unit 104 identifies household electrical appliances used during the peak power consumption period, based on records of the power consumption stored in the household-electrical-appliance power record storage unit 103. Furthermore, the lifestyle period determining unit 1702 determines periods of a lifestyle with reference to use states of the household electrical appliances (S2402).

The lifestyle regularity determining unit 1703 selects one of the lifestyles having a period that matches the peak power consumption period (S2403). Without such a lifestyle (No at Step S2403), the utilization-time changing support device 1700 ends the processing.

The lifestyle regularity determining unit 1703 calculates variance of end times of the periods of the lifestyle selected at Step S2403, with reference to the past records of the periods (Step S2404).

The lifestyle regularity determining unit 1703 determines that the lifestyle is not regular when the variance calculated at Step S2404 is larger than a predetermined threshold (Yes at Step S2405). Then, the period change possibility determining unit 106 determines that the period of the lifestyle can be changed. Furthermore, the period change possibility determining unit 106 determines another period, and presents the other period to the user (Step S2406).

When the variance is equal to or smaller than the predetermined threshold (No at Step S2405), the period change possibility determining unit 106 determines that the period cannot be changed. Thus, the lifestyle regularity determining unit 1703 selects another lifestyle having a period that matches the peak power consumption period (Step S2407). Then, the processes after Step S2404 are performed on the selected lifestyle. Without such a lifestyle, the utilization-time changing support device 1700 ends the processing.

The peak power consumption can be reduced with the aforementioned processes.

The period change possibility determining unit 106 may determine that the period of the lifestyle can be changed only when the peak power consumption can be reduced as in Embodiment 1.

Furthermore, in Embodiment 2, the lifestyle of the user is identified using the correspondence information in FIG. 20 and the information of the periods of the lifestyle in FIG. 21. The peak power consumption may be reduced by proposing change in time of a daily life event having no duration, instead of using the lifestyle having a predetermined duration. The daily life events are starting operations of, for example, waking up, going to bed, outing, and retuning home. FIG. 27 illustrates correspondence between the daily life events and household electrical appliances to be used in the daily life events. For example, an air conditioner, an electric light, or a television is used in waking up as a daily life event. Furthermore, the waking up operation is detected by the start time of the air conditioner in the morning (time when the power is ON), the time when the room light is turned ON, or the time when the television is turned ON.

(Embodiment 3)

Embodiments 1 and 2 describe proposing, to the user, the advice on the use of a household electrical appliance as an off-line result of the analysis. For example, when the user checks the power charge of one day before going to bed, the power measuring system generates the advice for effectively using the energy by analyzing records of power consumption. In contrast, Embodiment 3 describes a power measuring system that predicts a household electrical appliance to be used in the future, in the daily life of the user, and dynamically proposes changing the utilization time of the appliance to the user. As such, the power measuring system predicts a household electrical appliance that seems to be used one hour or two hours later with reference to records of power consumption of the user, and advises changing the utilization period of the appliance. Accordingly, the user can change the utilization start time without forgetting to change it. In Embodiment 3, the same reference numerals are used for the constituent elements of Embodiments 1 and 2, and the description thereof will be omitted as necessary.

The configuration of the power measuring system in Embodiment 3 is the same as that of the power measuring system 200 according to Embodiment 1 in FIG. 1. However, the configuration of the utilization-time changing support device differs from that of Embodiment 1.

Figure 28:
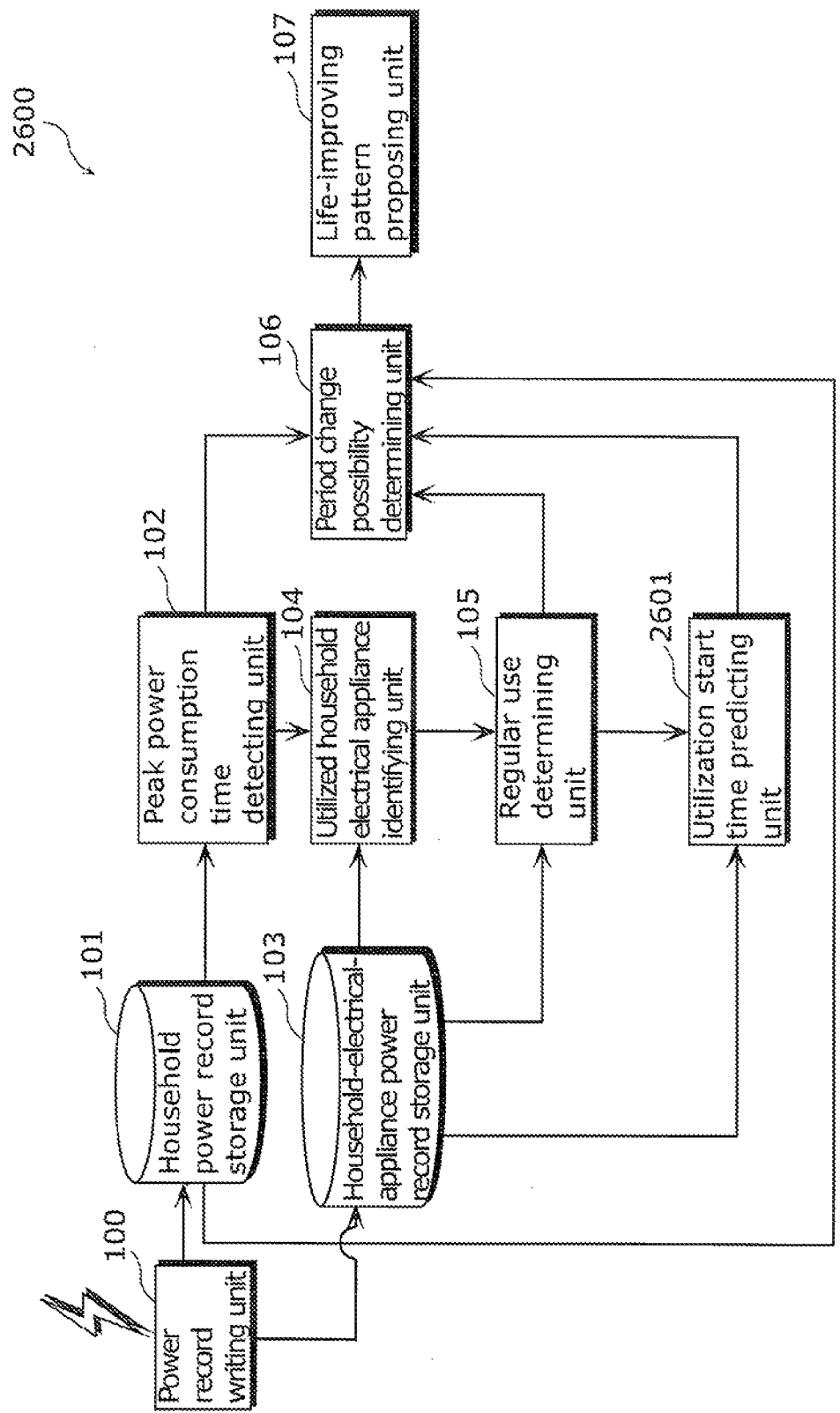
FIG. 28 is a block diagram illustrating a functional configuration of a utilization-time changing support device according to Embodiment 3.

FIG. 28 is a block diagram illustrating a functional configuration of a utilization-time changing support device 2600 according to Embodiment 3.

The utilization-time changing support device 2600 includes a utilization start time predicting unit 2601 in addition to the configuration of the utilization-time changing support device 216 according to Embodiment 1 in FIG. 2.

The utilization start time predicting unit 2601 predicts a time in which the household electrical appliance determined by the regular use determining unit 105 as being regularly used is to be used, with reference to data of records of amounts of power consumption stored in the household-electrical-appliance power record storage unit 103.

Figure 29:
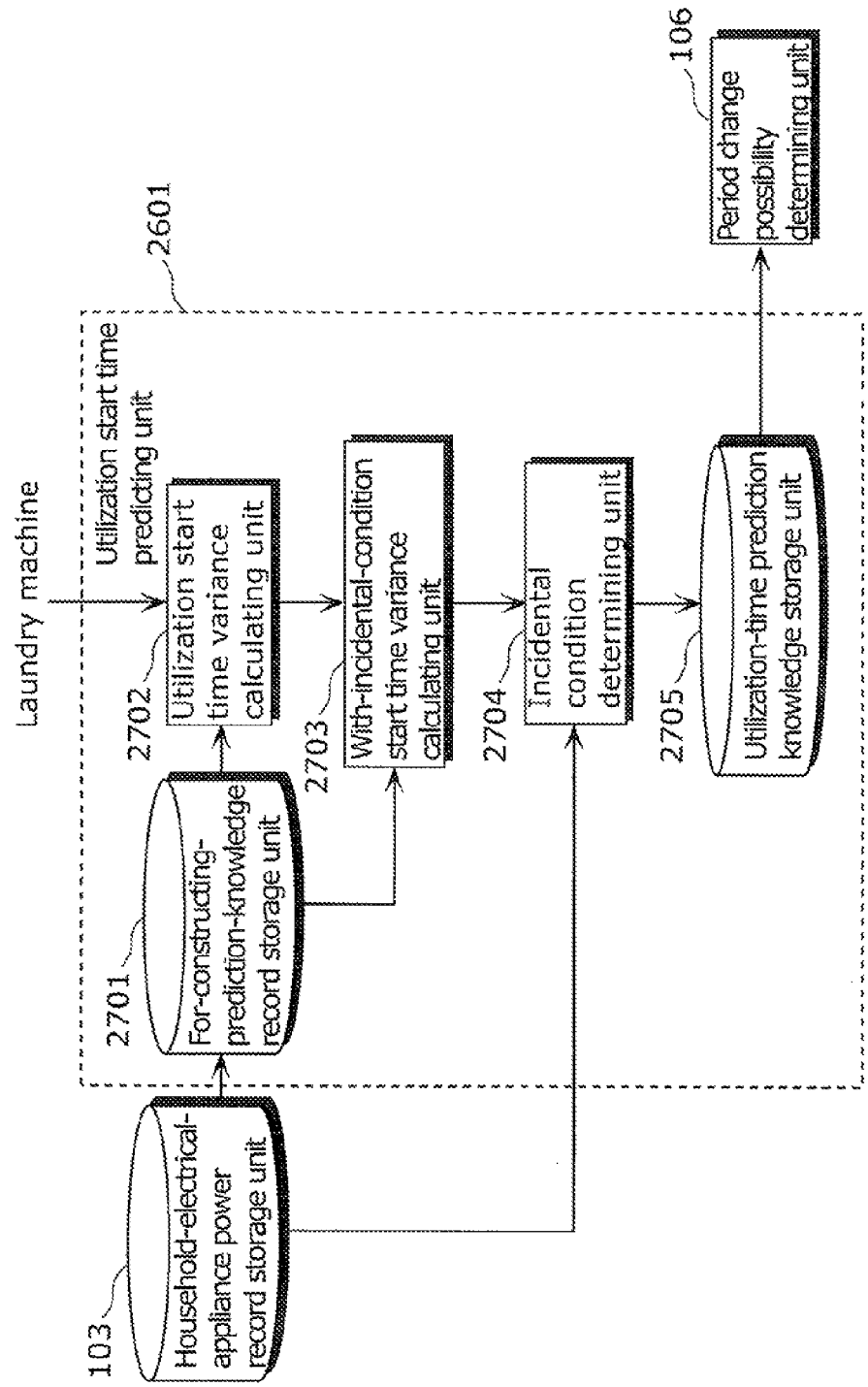
FIG. 29 is a block diagram illustrating a functional configuration of a utilization start time predicting unit.

FIG. 29 is a block diagram illustrating a functional configuration of the utilization start time predicting unit 2601.

The utilization start time predicting unit 2601 includes a for-constructing-prediction-knowledge record storage unit 2701, a utilization start time variance calculating unit 2702, a with-incidental-condition start time variance calculating unit 2703, an incidental condition determining unit 2704, and a utilization-time prediction knowledge storage unit 2705.

The for-constructing-prediction-knowledge record storage. unit 2701 extracts records for predicting the use of a household electrical appliance, for example, data of records of power consumption for the past one month, from the records of power consumption of the household electrical appliance stored in the household-electrical-appliance power record storage unit 103, and stores the records.

Figure 30:
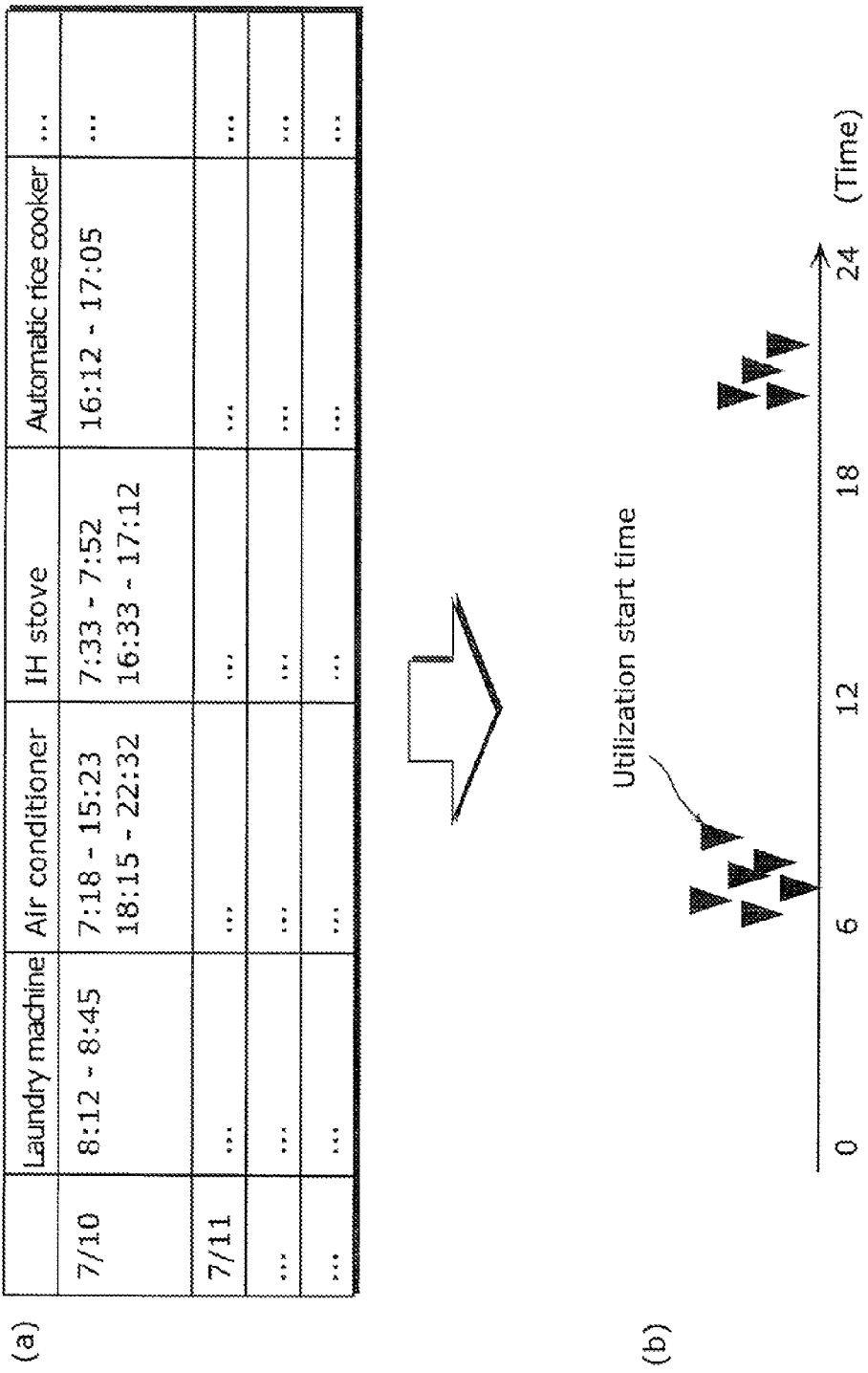
FIG. 30 illustrates a process of calculating variance of utilization start times.

The utilization start time variance calculating unit 2702 calculates variance of the utilization start times of a target household electrical appliance for prediction, using the records stored in the for-constructing-prediction-knowledge record storage unit 2701. For example, when a laundry machine is selected as the target household electrical appliance for prediction, the utilization start time variance calculating unit 2702 extracts utilization start times at which the laundry machine started to be used, with reference to the record data stored in the for-constructing-prediction-knowledge record storage unit 2701, and calculates the variance of the utilization start times. Although the laundry machine will be used as the target household electrical appliance for prediction hereinafter, the same processes are performed even when another household electrical appliance is selected as the target appliance. The specific example will be described with reference to FIG. 30. FIG. 30 (*a*) illustrates an example of data stored in the for-constructing-prediction-knowledge record storage unit 2701. In other words, a laundry machine was used between 8:12 to 8:45 in July 10. FIG. 30 (*b*) illustrates the distribution of utilization start times of the laundry machine, based on the data in FIG. 30 (*a*). The horizontal axis represents the time, and the triangles represents the times at which the laundry machine started to be used. According to FIG. 30 (*b*), the utilization start times of the laundry machine vary between the morning and the evening. The utilization start time variance calculating unit 2702 calculates a degree of variation by calculating the variance of the utilization start times. When the variance is larger than a predetermined threshold, it is assumed that the start times vary due to a certain factor.

Figure 31:
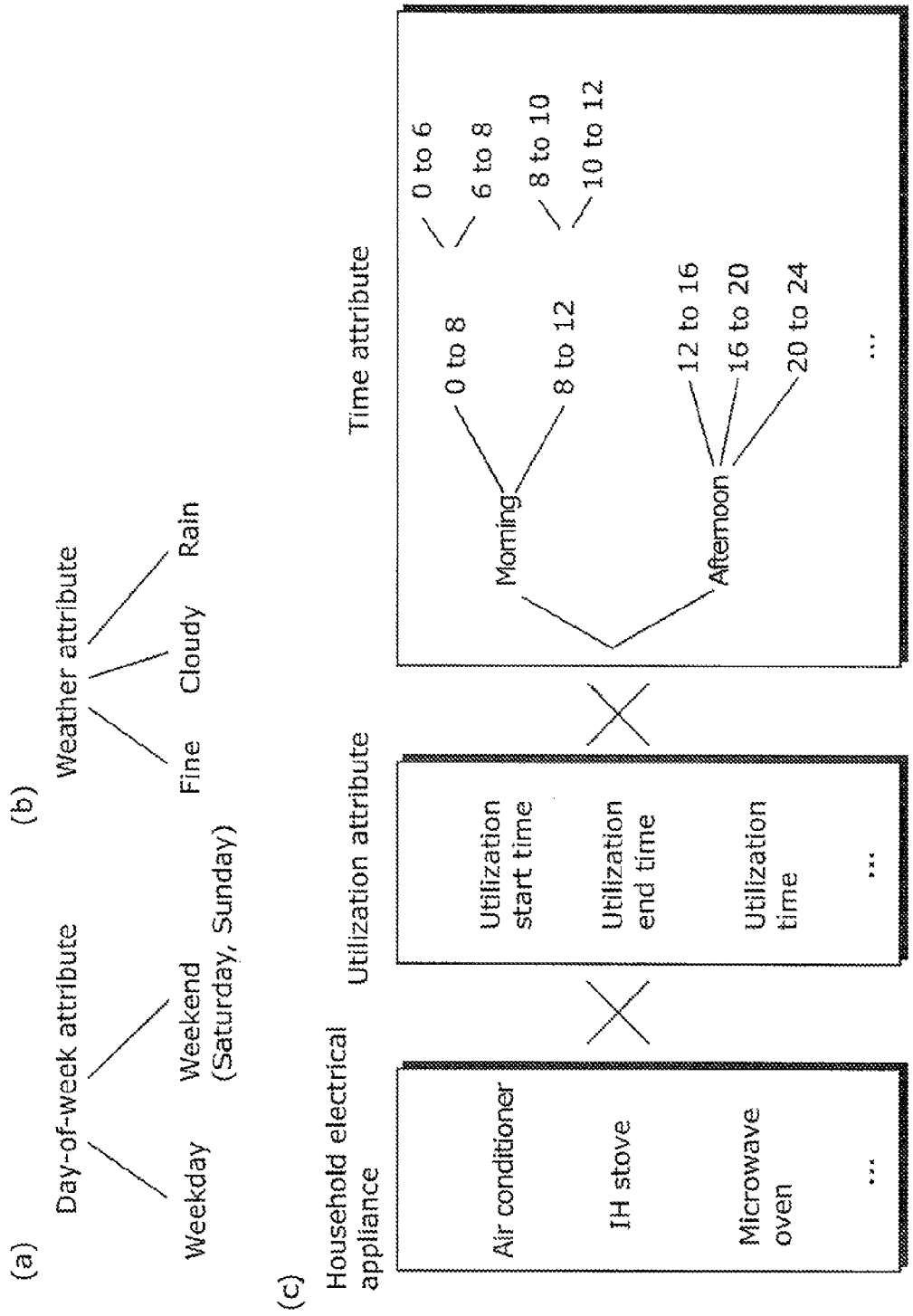
FIG. 31 illustrates an example of incidental conditions.

When the utilization start times of the laundry machine vary as illustrated in FIG. 30 (*b*), the with-incidental-condition start time variance calculating unit 2703 assigns an incidental condition to the utilization start times to calculate the variance again. FIG. 31 illustrates an example of the incidental condition. FIG. 31 (*a*) illustrates a day-of-week attribute as the incidental condition. The day-of-week attribute can be classified into weekday and weekend. FIG. 31 (*b*) illustrates a weather attribute as the incidental condition. The weather attribute can be classified into attributes values indicating, for example, fine, cloudy, and rain. FIG. 31 (*c*) illustrates incidental conditions with combinations of household electrical appliances, utilization attributes, and time attributes. In other words, the time attribute can be assigned, for each of the household electrical appliances, to one of utilization attributes, that is, the utilization start time, the utilization end time, and the utilization time of the appliance. The time attribute may be classified into relatively rough categories, such as the morning and the afternoon, or into detailed periods, such as a period between 0 to 8 or between 8 to 12 in the morning. Furthermore, the time attribute may be classified into more detailed periods, such as a period between 0 to 6 or between 6 to 8 o'clock. For example, the attribute of the utilization start time of the air conditioner can be classified into the morning and the afternoon.

The with-incidental-condition start time variance calculating unit 2703 and the incidental condition determining unit 2704 automatically extract an attribute with a high relevance with the start time of the laundry machine, using such various incidental conditions. The detailed method of the extraction will be described hereinafter.

First, the utilization start times of the laundry machine are classified using the conditions of each attribute in FIG. 31. For example, the with-incidental-condition start time variance calculating unit 2703 determines the day-of-week attribute as an incidental condition, and calculates variance of the utilization start times of the laundry machine in a weekday and the variance in a weekend. Furthermore, when determining the weather attribute as an incidental condition, the with-incidental-condition start time variance calculating unit 2703 calculates variance of the utilization start times of the laundry machine for each case where the weather is fine, cloudy, and rainy. Furthermore, as for the use of the household electrical appliance, the with-incidental-condition start time variance calculating unit 2703 calculates variance of the utilization start times of the air conditioner for each case where the utilization start time of the air conditioner is in the morning and in the afternoon. Similarly, the with-incidental-condition start time variance calculating unit 2703 calculates variance for the IH stove and the microwave oven. As a result when an incidental condition has a higher correlation with the utilization start time of the laundry machine, a degree of the variance calculated with the incidental condition highly sharply decreases. The incidental condition determining unit 2704 determines an incidental condition correlated with the utilization start time of the laundry machine, using the variance after assigning the incidental condition as an evaluation index.

FIG. 32 illustrates a method of determining an incidental condition, and indicates variance calculated by assigning an incidental condition and distribution of utilization start times of a laundry machine when the incidental condition is assigned. The method of displaying the distribution is the same as that illustrated in FIG. 30 (*b*).

For example, when a day-of-week attribute is weekday as illustrated in FIG. 32, the utilization start times of the laundry machine are concentrated in the morning, whereas the day-of-week attribute is weekend, the utilization start times of the laundry machine are concentrated in the evening. Thus, when the utilization start times of the laundry machine are classified by day-of-week attributes of weekday and weekend, the variance of the utilization start times of the laundry machine is indicated by small values, 2.3 and 1.0 for weekday and weekend, respectively. On the other hand, the utilization start times of the laundry machine are classified by a weather attribute. When the weather is fine, the laundry machine starts to be operated both in the morning and the evening. As a result, the variance is indicated by a larger value of 4.2. As such, the with-incidental-condition start time variance calculating unit 2703 classifies the utilization start times of the laundry machine using each incidental condition, and calculates the variance of the utilization start times of the laundry machine per category. The incidental condition determining unit 2704 calculates an average of the variances per attribute, and determines the attribute having the smallest average of the variances, as an incidental condition correlated with the utilization start times of the laundry machine. For example, the average of the variances of the day-of-week attribute is 1.6 (=(2.3+1.0)/2), and the average of the variances of the weather attribute is 5.9 (=(4.2+6.4+7.2)/3). Furthermore, an average of variances when utilization start times of an air conditioner are used as attributes is 6.0 (=(5.8+6.2)/2). Among these averages of the variances, the average of the variances of the day-of-week attribute is the smallest. Thus, the incidental condition determining unit 2704 determines that the day-of-week attribute is relevant to the utilization start times of the laundry machine, and determines the day-of-week attribute as an incidental condition of the laundry machine.

The incidental condition determining unit 2704 stores knowledge information indicating relationship between a determined incidental condition and utilization start times of the laundry machine, in the utilization-time prediction knowledge storage unit 2705. For example, the incidental condition determining unit 2704 stores knowledge information indicating that, in the example of the laundry machine, the user starts to use the laundry machine in the morning when the day-of-week is weekday, and the user uses the laundry machine in the evening when the day-of-week is weekend. The morning and the evening are examples of utilization start times, and instead of the morning and the evening, for example, 8 o'clock and 20 o'clock may be the utilization start times. Each of the utilization start times may be the earliest time and the last time in the distribution of the utilization start times. Furthermore, each of the utilization start times may be an average of the utilization start times.

The period change possibility determining unit 106 determines whether or not the utilization period of a household electrical appliance determined by the regular use determining unit 105 as being regularly used can be changed, based on a result of the prediction by the utilization start time predicting unit 2601. The specific example will be hereinafter described using the example of the laundry machine.

When the regular use determining unit 105 determines that the laundry machine is a household electrical appliance regularly used, the period change possibility determining unit 106 determines a value of an attribute that is set as an incidental condition. In other words, when the day-of-week attribute is set as the incidental condition, the period change possibility determining unit 106 determines whether or not today is a weekday or a weekend. The day-of-week data for determining whether or not today is a weekday or a weekend is assumed to be given from outside. The period change possibility determining unit 106 predicts that the user will use the laundry machine in the morning when today is a weekday, and determines whether or not the utilization period of the laundry machine can be changed from the morning to another period when the peak power consumption period is in the morning. Furthermore, the period change possibility determining unit 106 predicts that the user will use the laundry machine in the evening when today is a weekend, and determines whether or not the utilization period of the laundry machine can be changed from the evening to another period when the peak power consumption period is in the evening.

When determining that the utilization period can be changed to another period, the period change possibility determining unit 106 outputs another period to the life-improving pattern proposing unit 107. The life-improving pattern proposing unit 107 proposes to the user changing a utilization period of a household electrical appliance to the other period received from the period change possibility determining unit 106.

The example above shows that the utilization start time can be predicted only by a day-of-week attribute, because the utilization start time of the laundry machine is relevant to a day-of-week. However, there are cases where the incidental condition determining unit 2704 sets incidental conditions. For example, in the example above, knowledge that the user starts to use the laundry machine in the morning of weekdays has been constructed. However, when the variance of the utilization start times of the laundry machine is large even in the morning, another condition is to be assigned. The incidental condition is determined by assigning an incidental condition on a weather or the use state of a household electrical appliance to each record in the weekdays, and calculating variance of the utilization start times, in the same manner as described above. As a result, knowledge, for example, that the user will start to use the laundry machine around 7 o'clock when starting to use the air conditioner before 6 o'clock and that the user will start to use the laundry machine around 8 o'clock when starting to use the air conditioner after 6 o'clock is extracted. This knowledge is extracted because the time at which the user starts to use the air conditioner depends on a wake-up time of the household, and there is a tendency to use the laundry machine early when the user gets up early, and to use the laundry machine late when the user gets up late. In such a case, when the utilization start times of the air conditioner depend on the wake-up time, the utilization start times of the air conditioner are extracted as a factor for determining a utilization start time of the laundry machine.

As such, a household electrical appliance to be used when the household has large power consumption is identified, and the time at which the appliance starts to be used is predicted, so that before the user starts to use the laundry machine, attention is given to the user not to increase the power consumption. For example, when the power consumption is large during the time when the user uses the laundry machine, an advice, such as "slightly delay the time during when the laundry machine is used" can be given to the user.

Figure 33:
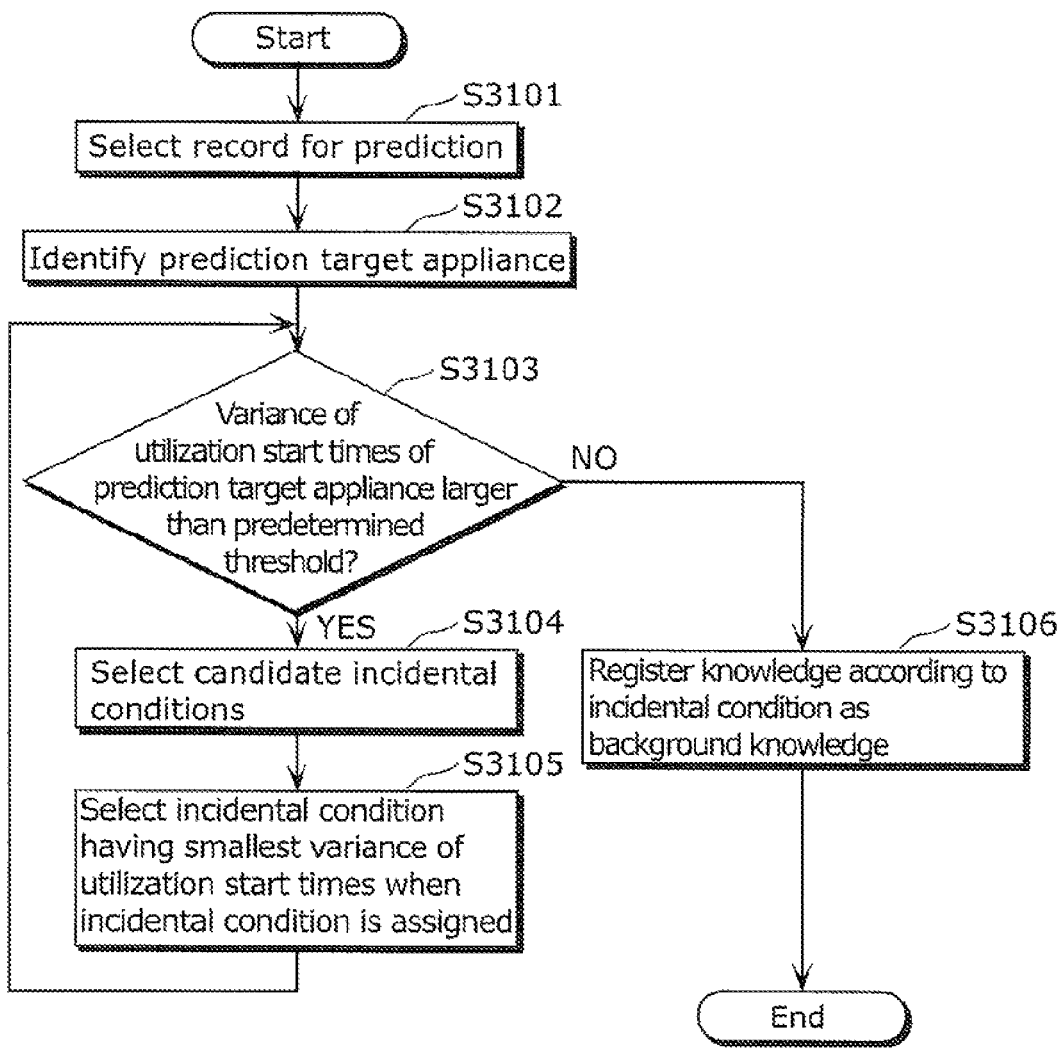
FIG. 33 is a flowchart of processes performed by the utilization start time predicting unit of the utilization-time changing support device according to Embodiment 3.

In summary, FIG. 33 is a flowchart of processes of the utilization start time predicting unit 2601 of the utilization-time changing support device 2600 with such a configuration. Since the procedure of the processes of other processing units in the utilization-time changing support device 2600 is the same described in Embodiment 1, the detailed description is not repeated herein.

The utilization start time variance calculating unit 2702 selects record data that is stored in the for-constructing-prediction-knowledge record storage unit 2701 and is to be used for prediction (Step S3101).

The regular use determining unit 105 identifies a prediction target appliance, and the utilization start time variance calculating unit 2702 calculates variance of utilization start times of the prediction target appliance (Step S3102).

When the calculated variance is larger than a predetermined threshold (Yes at Step S3103), the with-incidental-condition start time variance calculating unit 2703 selects candidate incidental conditions for classifying the records (Step S3104). For example, the candidate incidental conditions are, for example, the day-of-week attribute and the weather attribute.

The with-incidental-condition start time variance calculating unit 2703 calculates variance of utilization start times of the prediction target appliance, for each of the selected incidental conditions. Then, the incidental condition determining unit 2704 selects an incidental condition having the smallest variance (Step S3105). Then, the processes return to Step S3103.

When the calculated variance is equal to or smaller than the predetermined threshold (No at Step S3103), the incidental condition determining unit 2704 generates knowledge information using the incidental condition having the smallest variance, and registers the knowledge information in the utilization-time prediction knowledge storage unit 2705 (Step S3106).

With the processes from Step S3101 to Step S3106, it is possible to predict the time at which the user starts to use the prediction target appliance. Accordingly, it is possible to predict the household electrical appliance to be used by the user, and propose to the user changing the utilization time before using the household electrical appliance.

(Modification of Embodiment 3)

Embodiment 3 describes construction of knowledge for predicting a period during which a laundry machine is used, by selecting an incidental condition, such as a day-of-week, a weather, and use of other household electrical appliances, based on the past records of power consumption of the laundry machine in order to predict the period. On the other hand, in the general daily life, it is possible to construct knowledge for predicting a household electrical appliance to be used in the future, using a probability of use frequency of the appliance.

Figure 34:
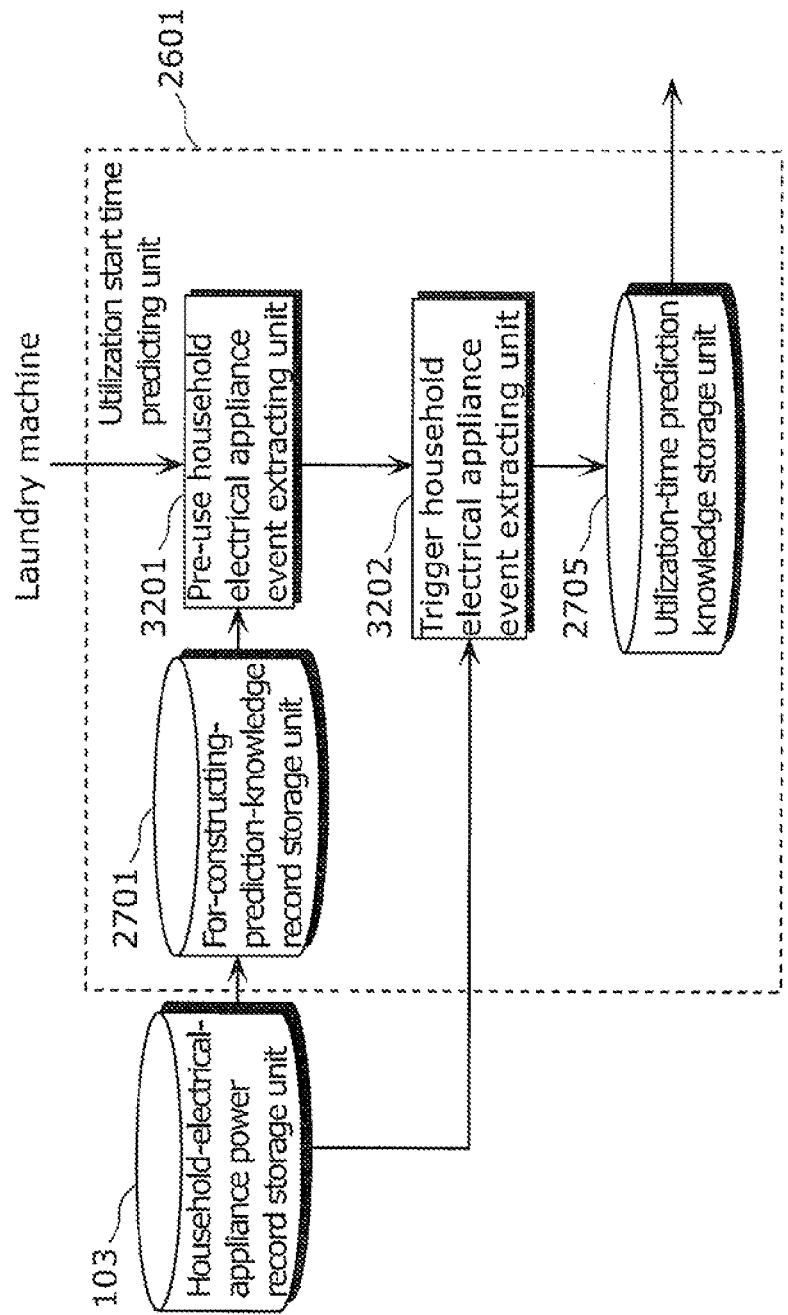
FIG. 34 is a block diagram illustrating a functional configuration of the utilization start time predicting unit according to a modification of Embodiment 3.

FIG. 34 is a block diagram illustrating a functional configuration of the utilization start time predicting unit 2601 according to the modification of Embodiment 3. The utilization start time predicting unit 2601 includes a for-constructing-prediction-knowledge record storage unit 2701, a pre-use household electrical appliance event extracting unit 3201, a trigger household electrical appliance event extracting unit 3202, and the utilization-time prediction knowledge storage unit 2705.

The for-constructing-prediction-knowledge record storage unit 2701 extracts records for predicting the use of a household electrical appliance, for example, data of records of power consumption of the household electrical appliance for the past one month, from the records of power consumption of the household electrical appliances stored in the household-electrical-appliance power record storage unit 103, and stores the records.

The pre-use household electrical appliance event extracting unit 3201 extracts an event of a target prediction appliance that occurs before the appliance is used, with reference to the records stored in the for-constructing-prediction-knowledge record storage unit 2701.

The trigger household electrical appliance event extracting unit 3202 extracts an event occurring with a predetermined probability or higher, from among the events of the household electrical appliance extracted by the pre-use household electrical appliance event extracting unit 3201.

The utilization-time prediction knowledge storage unit 2705 stores each set of an event of the target prediction appliance extracted by the trigger household electrical appliance event extracting unit 3202 and the appliance, as prediction knowledge.

Hereinafter, differences with Embodiment 3 will be mainly described.

The for-constructing-prediction-knowledge record storage unit 2701 stores, for example, records of household electrical appliances for the past one week as records for constructing prediction knowledge. Here, the pre-use household electrical appliance event extracting unit 3201 identifies the household electrical appliance determined by the regular use determining unit 105 as being regularly used and the utilization start period of the appliance. For example, the pre-use household electrical appliance event extracting unit 3201 identifies a laundry machine and a period between 7 and 8 o'clock as a household electrical appliance and the utilization start period. The pre-use household electrical appliance event extracting unit 3201 extracts events of household electrical appliances 15 minutes before the laundry machine starts to be used, when determining whether or not the laundry machine is used between 7 and 8 o'clock. The determination is made with reference to the records stored in the for-constructing-prediction-knowledge record storage unit 2701. More specifically, assume, for example, that the laundry machine started to be used at 7:42 in July 10 as illustrated in FIG. 35. Here, the pre-use household electrical appliance event extracting unit 3201 extracts events of household electrical appliances for 15 minutes between 7:27 and 7:42. For example, the pre-use household electrical appliance event extracting unit 3201 extracts events, such as turning ON a water heater, turning OFF an air conditioner, and turning ON a washstand light. Similarly, the pre-use household electrical appliance event extracting unit 3201 extracts events occurring before the laundry machine started to be used as the records in July 11. The pre-use household electrical appliance event extracting unit 3201 extracts the operations with reference to the records of days when the laundry machine was used (for example, records of 10 days). In FIG. 35, "Yes" indicates occurrence of an event.

The trigger household electrical appliance event extracting unit 3202 selects events useful to predict the use of the target household electrical appliances, from among the events extracted by the pre-use household electrical appliance event extracting unit 3201. In the example of FIG. 35, the trigger household electrical appliance event extracting unit 3202 calculates a probability that each event of the household electrical appliances occurs, using the records of 10 days. The trigger household electrical appliance event extracting unit 3202 determines an event with a higher probability as an event of a household electrical appliance that triggers the use of the laundry machine. For example, when the probability is higher than a predetermined threshold of 0.8, the trigger household electrical appliance event extracting unit 3202 determines the event as a trigger event to be used for prediction. In the example of FIG. 35, the probabilities that the water heater is turned OFF and the washstand light is turned ON are both 0.9, which is higher than the predetermined threshold of 0.8. Thus, the trigger household electrical appliance event extracting unit 3202 determines these two events as having the higher probabilities of occurrence 15 minutes before using the laundry machine. When these two events occur, since it is predicted that the laundry machine will start to be used between 7 and 8 o'clock, the trigger household electrical appliance event extracting unit 3202 registers, in the utilization-time prediction knowledge storage unit 2705, the knowledge for the prediction. As a result, the period change possibility determining unit 106 can predict that the laundry machine will be used after turning OFF the water heater and turning ON the washstand light.

In the example above, the trigger household electrical appliance event extracting unit 3202 determines two events having the occurrence probability equal to or higher than 0.8 as trigger events for knowledge for prediction, among the events occurring 15 minutes before using the laundry machine. However, sometimes, there is no trigger event having the occurrence probability exceeding 0.8 for the 15 minutes. In such a case, it is possible to increase the occurrence probability by changing 15 minutes to 30 minutes and extracting events of household electrical appliances. When there is no sufficient trigger event for the 15 minutes, the trigger household electrical appliance event extracting unit 3202 extracts trigger events by extending a period for extracting the events.

Figure 36:
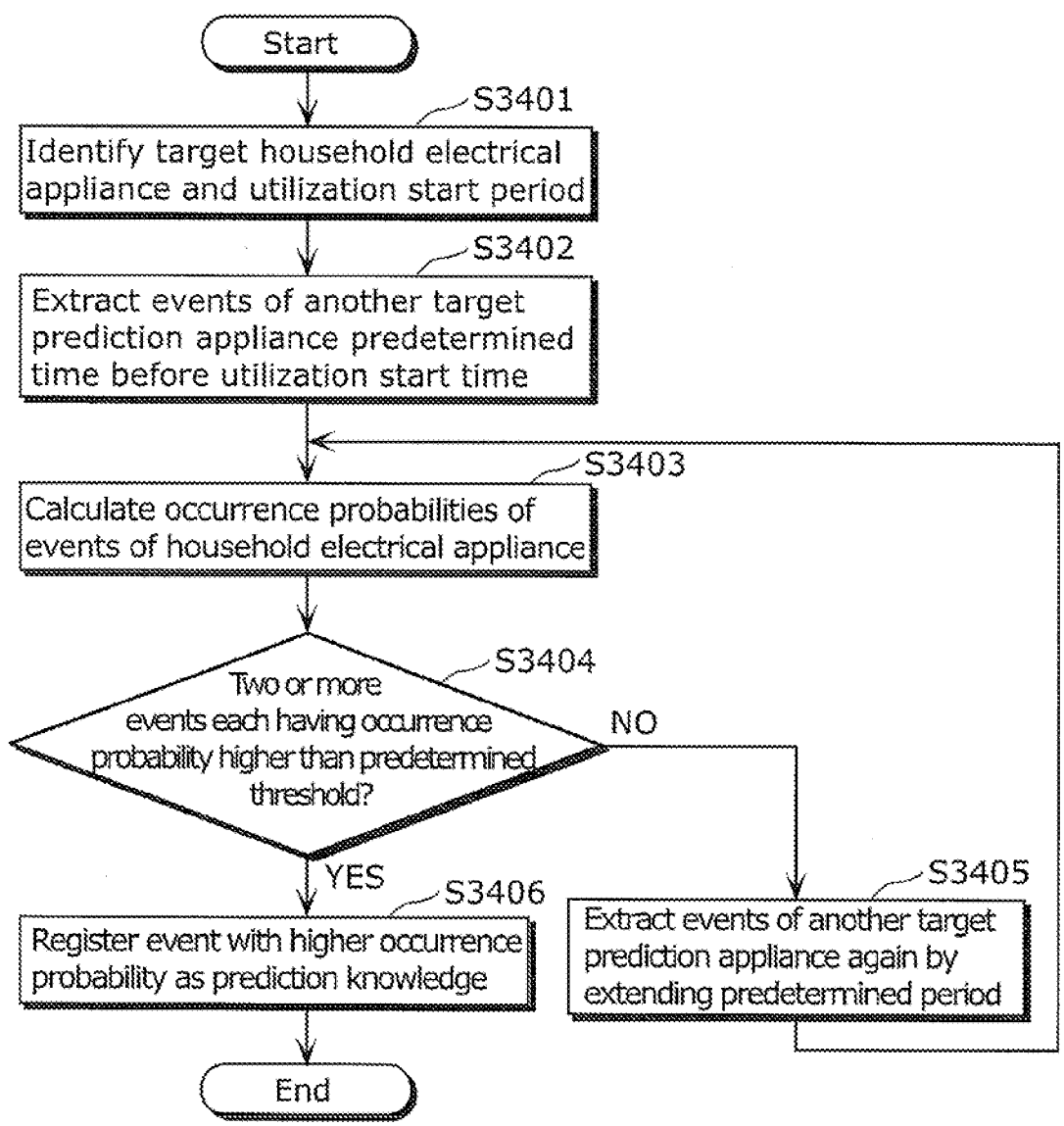
FIG. 36 is a flowchart of processes performed by the utilization start time predicting unit of the utilization-time changing support device according to a modification of Embodiment 3.

In summary, FIG. 36 is a flowchart of processes of the utilization start time predicting unit 2601 of the utilization-time changing support device 2600 with such a configuration.

The pre-use household electrical appliance event extracting unit 3201 identifies a target household electrical appliance and the utilization start period of the appliance (Step S3401). For example, the pre-use household electrical appliance event extracting unit 3201 identifies a laundry machine as the target household electrical appliance, and a period between 7 to 8 o'clock as the utilization start period.

The pre-use household electrical appliance event extracting unit 3201 extracts an event of a target prediction appliance except the laundry machine, occurring 15 minutes before the laundry machine starts to be used (Step S3402). As a result, the table data as illustrated in FIG. 35 is generated.

The trigger household electrical appliance event extracting unit 3202 calculates probabilities that events of a household electrical appliance occur (Step S3403). In the example of FIG. 35, the trigger household electrical appliance event extracting unit 3202 calculates a probability that each event of the household electrical appliances occurs, using the records of 10 days.

The trigger household electrical appliance event extracting unit 3202 determines whether or not there are two or more events each having an occurrence probability higher than a predetermined threshold (for example, 0.8) (Step S3404). The example of FIG. 35 shows the two events of turning OFF the water heater and turning ON the washstand light.

When determining that there are two or more events as a result of the determination at Step S3404 (Yes at Step S3404), the trigger household electrical appliance event extracting unit 3202 registers, in the utilization-time prediction knowledge storage unit 2705, these events as events that trigger the use of the household electrical appliance (Step S3406).

When determining that there is no such event or only one event as a result of the determination at Step S3404 (No at Step S3404), the trigger household electrical appliance event extracting unit 3202 extracts events as at Step S3402 by changing a period during which events of household electrical appliances are extracted (Step S3405). Then, the processes return to Step S3403. For example, although the processes are performed with reference to the records for 15 minutes before starting to use the laundry machine, when the trigger household electrical appliance event extracting unit 3202 does not extract sufficient trigger events, it tries to extract the trigger events again with reference to records for 30 minutes before starting to use the laundry machine.

With the processes from Steps S3401 to S3406, it is possible to extract knowledge for predicting the use of a household electrical appliance in a manner that fits the lifestyle of each household.

In Embodiment 3, events of other household electrical appliances for 15 minutes before starting to use the laundry machine are extracted as trigger events. However, it is possible to construct knowledge for predicting that the laundry machine starts to be used, when both of trigger events occur which are extracted for 15 minutes and 30 minutes before starting to use the laundry machine. For example, assume a case where 20 minutes before starting to do the laundry, the user sets the dishes used at breakfast in a dishwasher, and the dishwasher is operated, and then 10 minutes before starting to do the laundry, the user turns ON the washstand light. When the use of the laundry machine is predicted, trigger events are extracted during each period from 0 to 15 minutes and from 15 to 30 minutes before starting to use the laundry machine, so that knowledge on the trigger events in consideration of the order of the events can be constructed.

The utilization-time changing support device according to Embodiments 1 to 3 can be implemented by a computer. In other words, such implementation is possible by causing a computer to execute a program for implementing the processes of the utilization-time changing support device.

Figure 37:
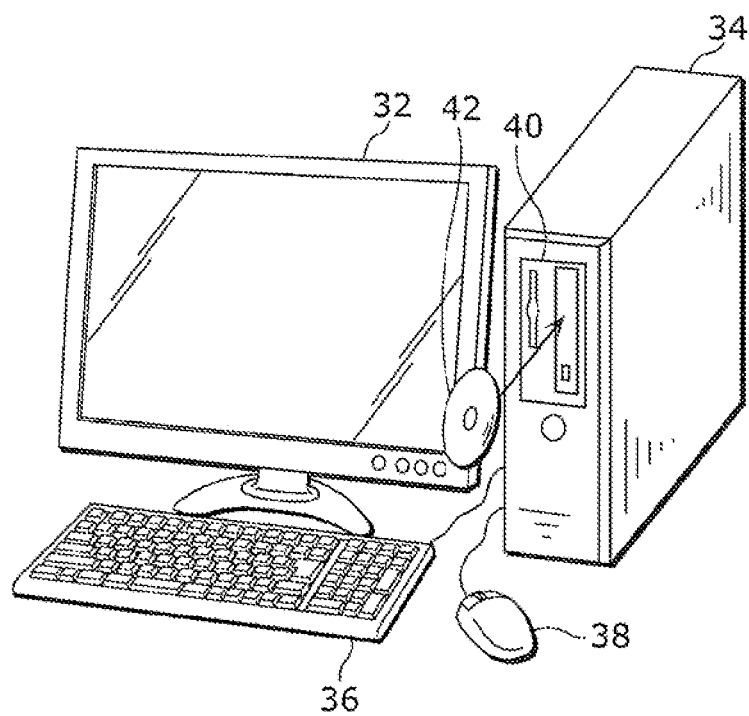
FIG. 37 is an external view of the utilization-time changing support device.

FIG. 37 is an external view of the utilization-time changing support device. The utilization-time changing support device includes a computer 34, a keyboard 36 and a mouse 38 for instructing the computer 34, a display 32 for presenting information such as a result of the computation by the computer 34, a compact disc-read only memory (CD-ROM) device 40 for reading a program executed by the computer 34, and a communication modem (not illustrated).

The program for implementing the utilization-time changing support device is stored in a CD-ROM 42 that is a computer-readable medium, and is read by the CD-ROM device 40. Furthermore, the program is read by the communication modem via a computer network (not illustrated).

Figure 38:
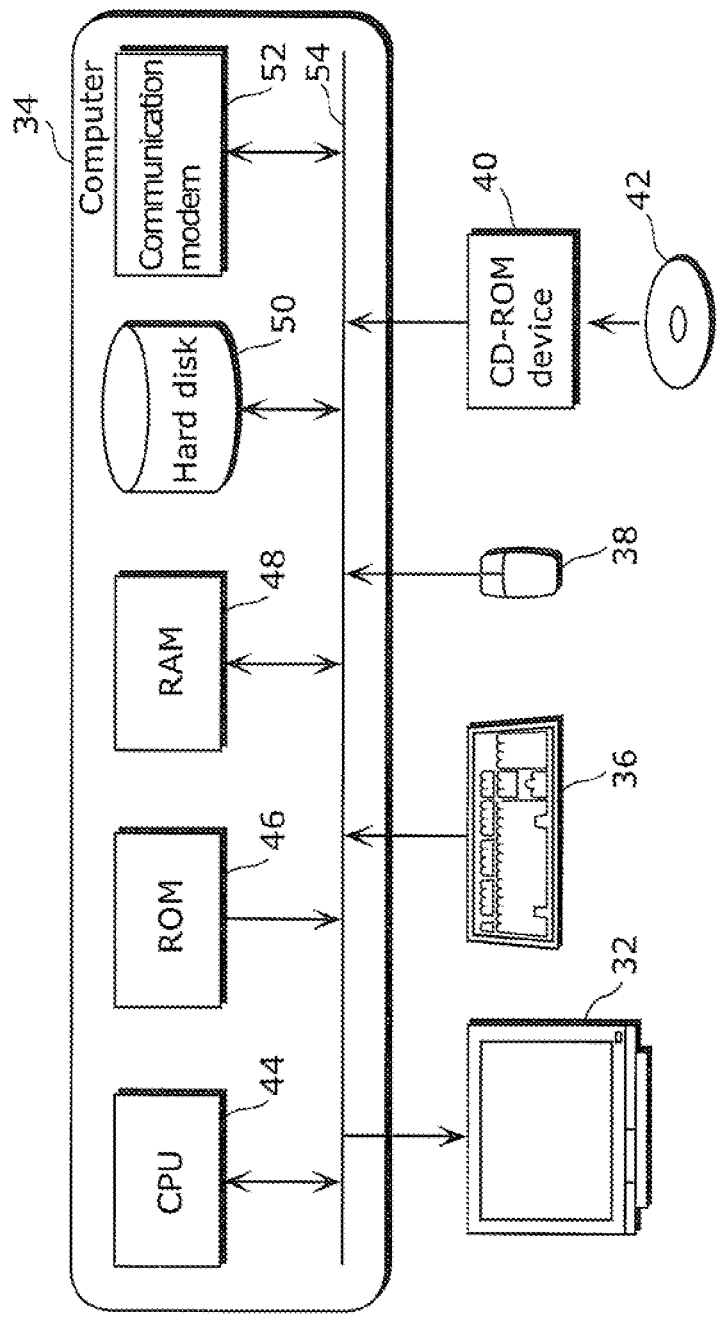
FIG. 38 is a block diagram illustrating a hardware construction of the utilization-time changing support device.

FIG. 38 is a block diagram illustrating a hardware construction of the utilization-time changing support device. The computer 34 includes a central processing unit (CPU) 44, a read only memory (ROM) 46, a random access memory (RAM) 48, a hard disk 50, a communication modem 52, and a bus 54.

The CPU 44 executes a program read through the CD-ROM device 40 or the communication modem 52. The ROM 46 stores a program and data necessary for operating the computer 34. The RAM 48 stores data, such as a parameter for executing a program. The hard disk 50 stores a program and data. The communication modem 52 communicates with other computers via the computer network. The bus 54 is interconnected to the CPU 44, the ROM 46, the RAM 48, the hard disk 50, the communication modem 52, the display 32, the keyboard 36, the mouse 38, and the CD-ROM device 40.

Although the power measuring system according to Embodiments of the present invention is described hereinbefore, the present invention is not limited to Embodiments herein.

For example, Embodiments describe changing a utilization period of a household electrical appliance from a peak power consumption period to reduce the peak power consumption. The disclosure, being not limited to the changing process, may include supporting the change, for example, from a period during which power charges in the daytime are high to a period during which power charges at nighttime are low.

Furthermore, although Embodiments assume the case where the user inputs a name or a model name of a household electrical appliance connected to the utilization-time changing support device for identifying the appliance, the model name may be automatically estimated by waveforms indicating the change in power consumption of the appliance, and registered. Thus, information indicating the correspondence between each model name and the waveforms is set in advance, so that the connected model can be estimated with reference to the information.

Furthermore, it is possible to determine that the household electrical appliance is used by (i) measuring the power consumption at nighttime during which the household electrical appliance is less likely to be used, (ii) storing a result of the measurement as a value of standby power consumption, and (iii) determining that power larger than the value is consumed.

In addition, although the life-improving pattern proposing unit 107 proposes a life-improving pattern based on a result of the determination by the period change possibility determining unit 106 in Embodiments, it is possible that an operation control unit (not illustrated) automatically changes a utilization period of a household electrical appliance based on the result and controls operations of the appliance.

Figure 39:
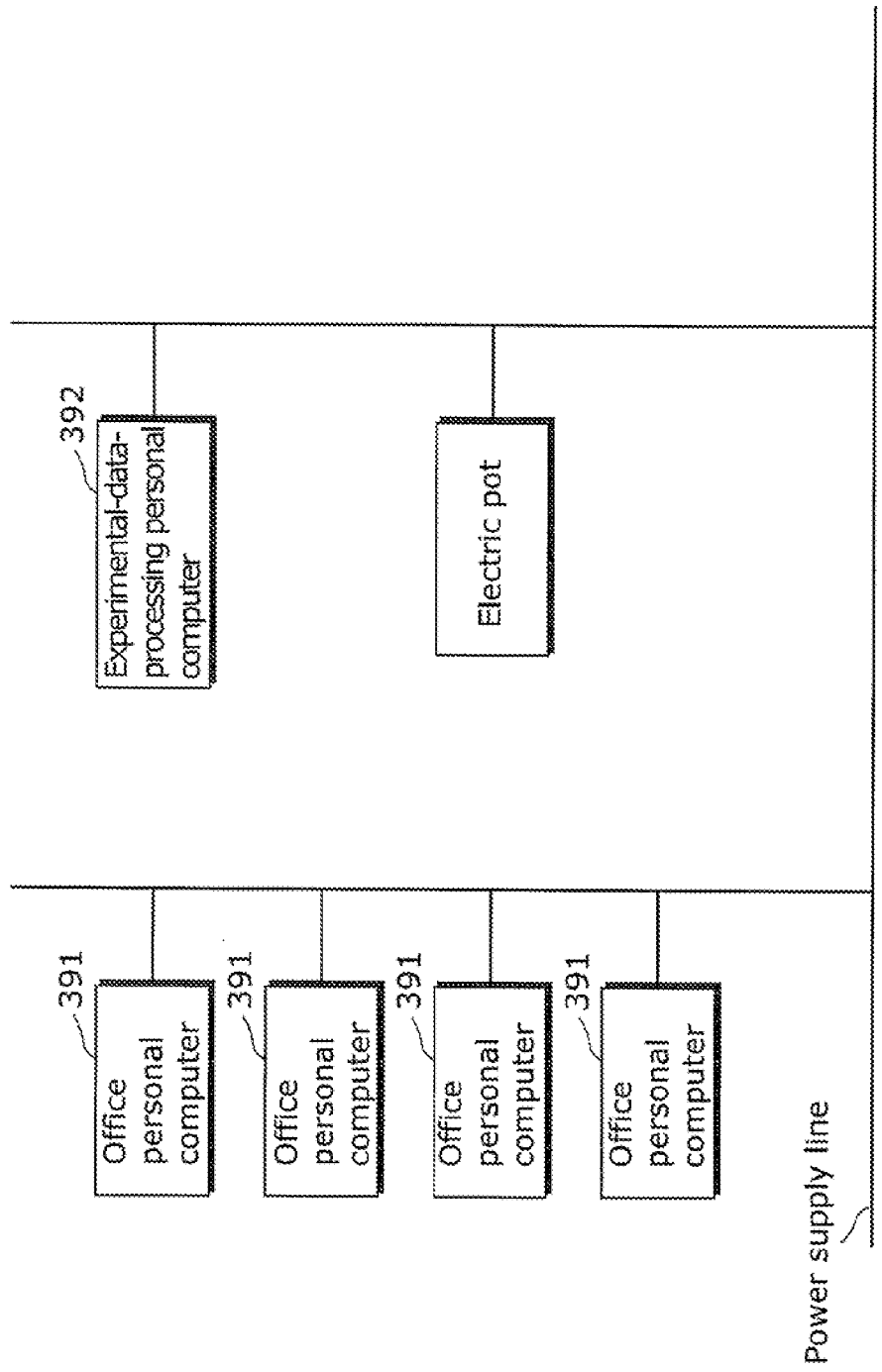
FIG. 39 illustrates an example of a configuration of household electrical appliances used in an office space.

Furthermore, Embodiments describe an example of determining the possibility of changing a utilization period of a household electrical appliance based on a use state of the appliance in a household. The same advantages can be obtained by performing the same processing for electrical appliances used in a living space, such as an office. For example, as illustrated in FIG. 39, assume an environment in an office space with office personal computers 391 for producing files or in-house documents, and an experimental-data-processing personal computer 392 for development of new products. Here, each worker in the office turns ON the office personal computer 391 upon arrival to the office, and turns it OFF when leaving the office. Since the worker conducts the experiment in various times depending on each day, there are variations in the times when the experimental-data-processing personal computer 392 is used.

Figure 40:
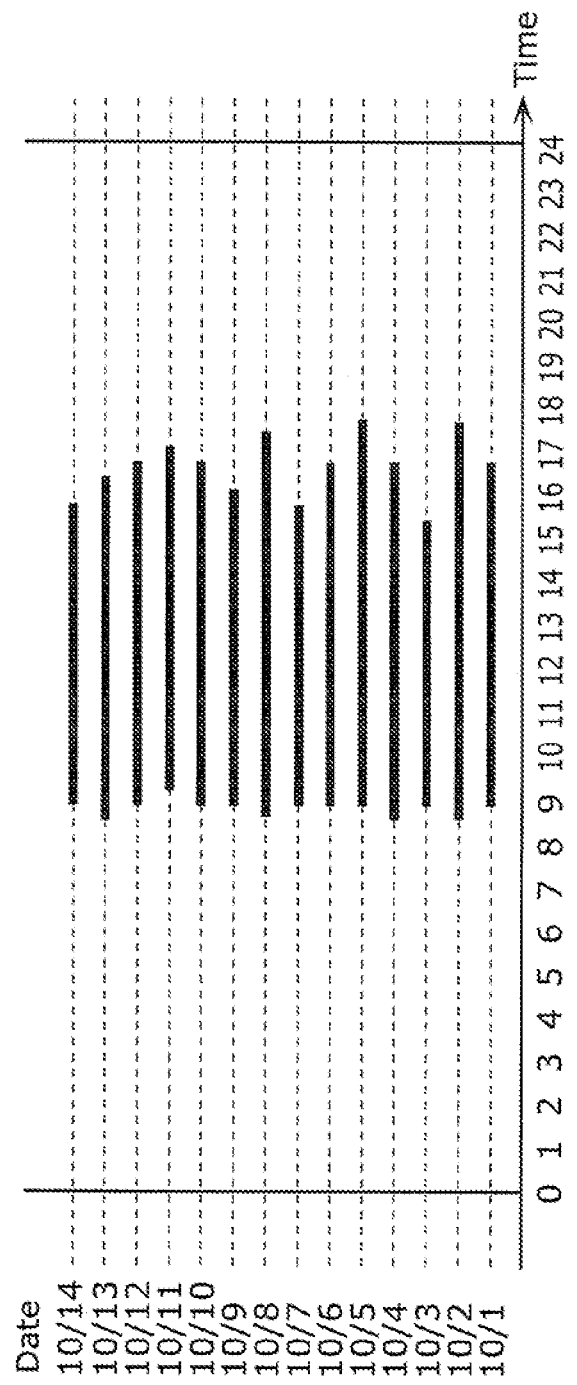
FIG. 40 illustrates an example of records of power consumption by an office personal computer.
Figure 41:
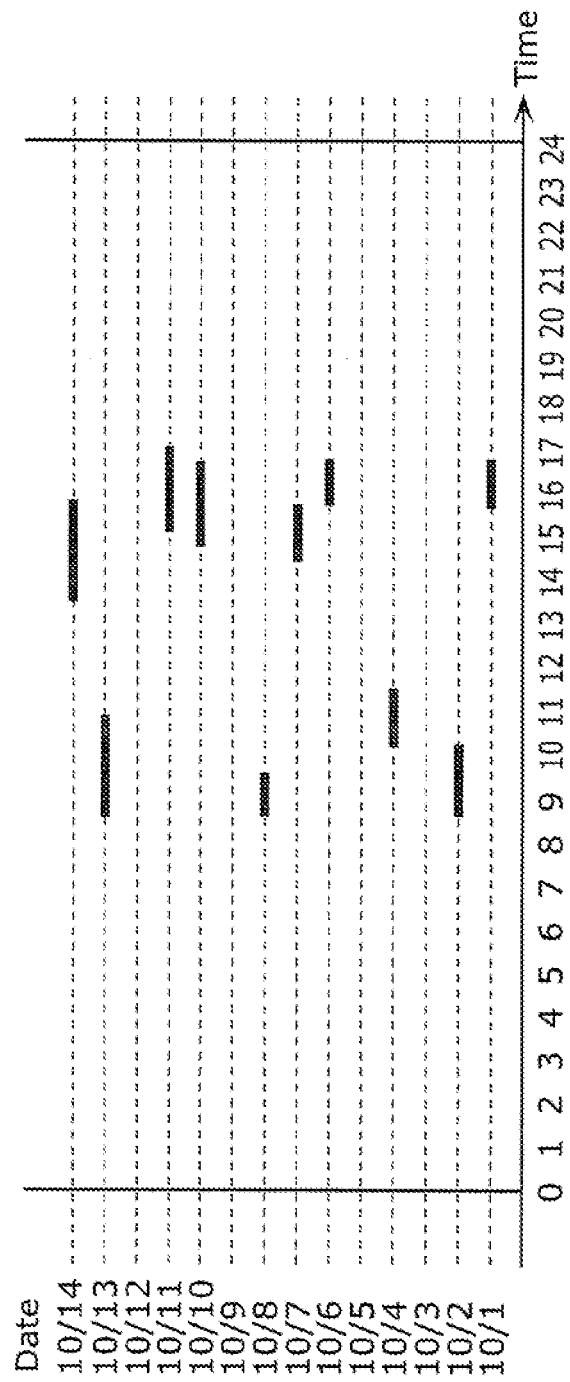
FIG. 41 illustrates records of power consumption by an experimental-data-processing personal computer.

As such, two types of the personal computers 391 and 392 that are identical to each other have greatly different records of power consumption. More specifically, FIG. 40 illustrates records of power consumption by one of the office personal computers 391, and FIG. 41 illustrates records of power consumption by the experimental-data-processing personal computer 392. In other words, the office personal computer 391 has little variation in the utilization periods of the power consumption, and it is determined that the office personal computer 391 is regularly used. In contrast, the experimental-data-processing personal computer 392 has variations in the utilization periods of the power consumption. Here, although the period change possibility determining unit 106 determines that it is difficult to change utilization periods of the office personal computer 391 with little variation, and determines that the utilization periods of the experimental-data-processing personal computer 392 can be changed. Thus, when both of the personal computers 391 and 392 are used during a peak power consumption period, the period change possibility determining unit 106 determines that the utilization periods of the experimental-data-processing personal computer 392 can be easily changed. Then, the life-improving pattern proposing unit 107 proposes changing the utilization period to the user. Furthermore, the proposed period is a period during which the user has previously used the appliance.

Accordingly, the present invention is applicable to a household electrical appliance not only in a household but also used in an office for business purposes.

Furthermore, although the state where a household electrical appliance is used "at a fixed time" is also described as, for example, "regularly used" in Embodiments, the household electrical appliance may be regarded as being "regularly used" when the household electrical appliance is used every day on a per day unit basis with regardless of a day-of-week or a holiday, even without any fixed time.

Figures 42, 43:
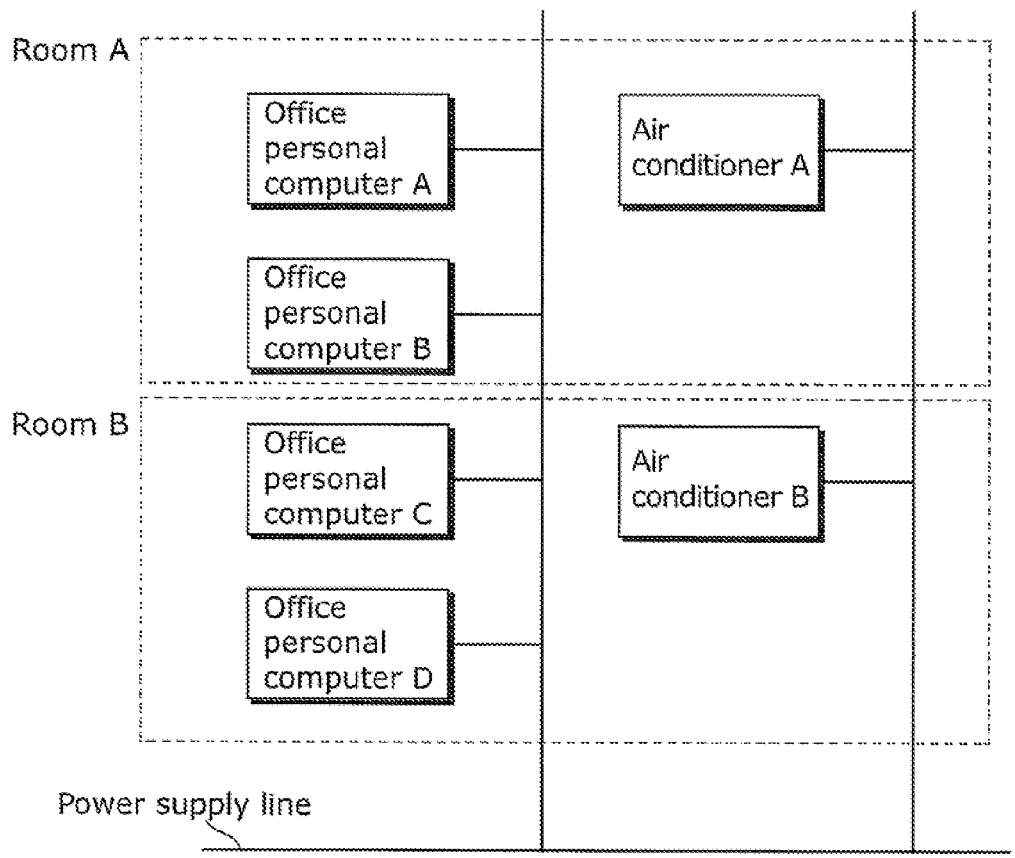
FIG. 42 illustrates an example of a configuration of household electrical appliances used in a room A and a room B in an office.
FIG. 43 illustrates an example of information on household electrical appliances used per room.

Furthermore, the utilization-time changing support device 1700 according to Embodiment 2 includes the by-lifestyle household electrical appliance storage unit 1701, and proposes changing a utilization period for each lifestyle. This proposal can be made not only for a household electrical appliance in a household but also for a household electrical appliance used in a living space, such as an office. For example, the proposal may be made by storing records of use states of power consumption in a room A and a room B as illustrated in FIG. 42. Here, the room A is equipped with office personal computers A and B, and an air conditioner A, whereas the room B is equipped with office personal computers C and D, and an air conditioner B.

In order to implement functions of the household electrical appliances, in Embodiment 2, information of the household electrical appliances used in a lifestyle, such as meal preparation, is held for each lifestyle in advance as illustrated in FIG. 20. In contrast, the information of the household electrical appliances used per room may be held in advance as illustrated in FIG. 43. In many cases, workers generally conduct business on a per room unit basis. Thus, periods during which the household electrical appliances are used may be classified per room. As illustrated in FIG. 43, for example, information indicating that the household electrical appliances used in the room A are the office personal computers A and B, and the air conditioner A.

Figure 44A:
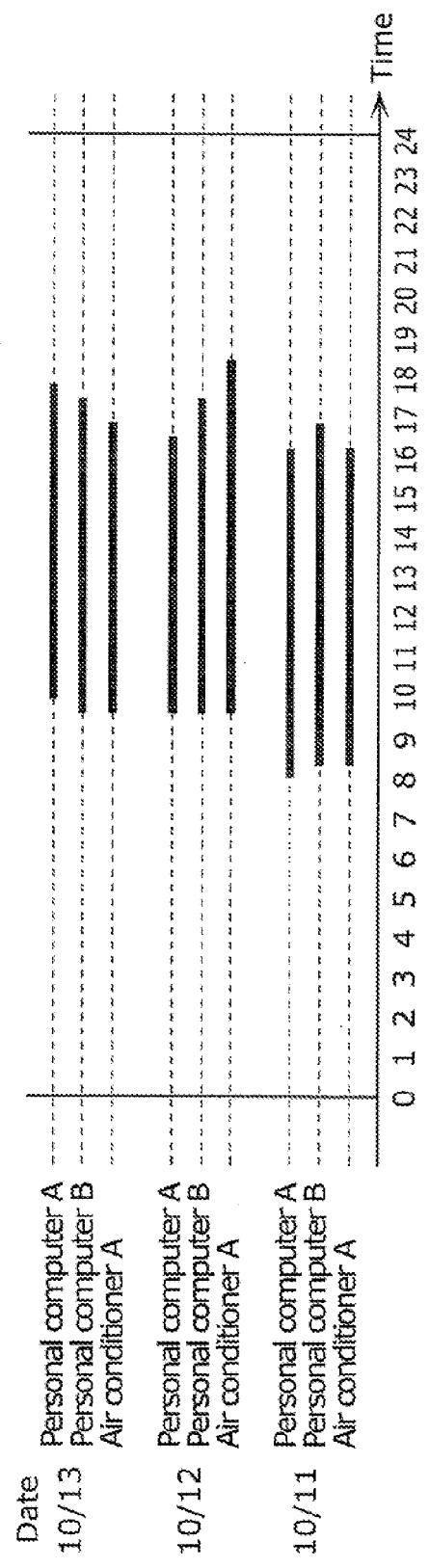
FIG. 44A illustrates utilization records of each household electrical appliance in the room A.
Figure 44B:
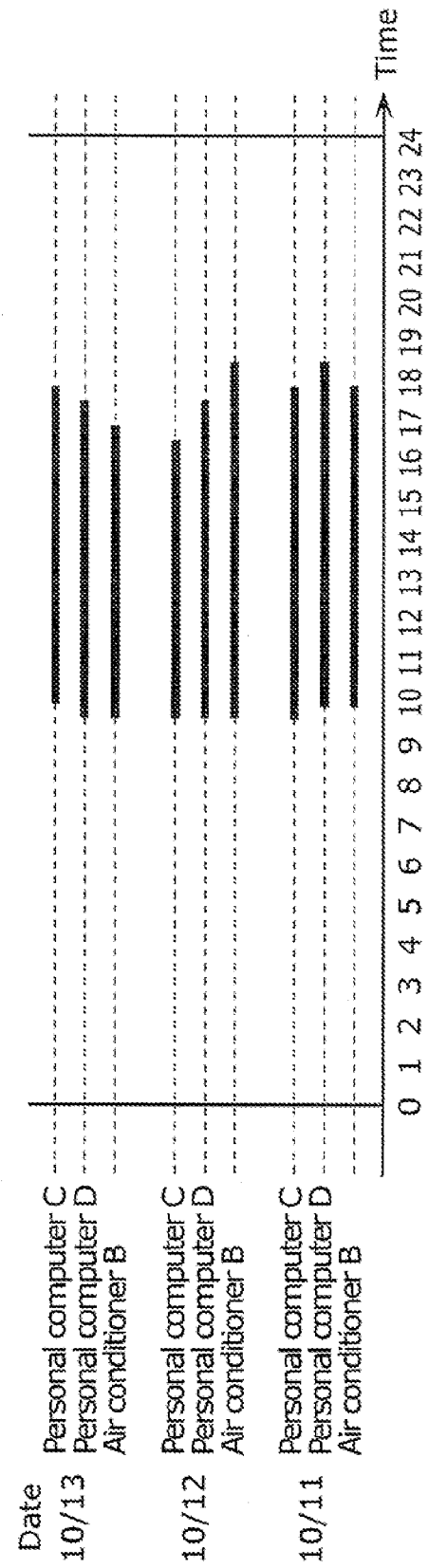
FIG. 44B illustrates utilization records of each household electrical appliance in the room B.

When the household electrical appliances used per room are identified from the information specified in FIG. 43, it is possible to obtain records of utilization periods of the household electrical appliances for each day as illustrated in FIGS. 44A and 44B. FIGS. 44A and 44B illustrate records of utilization periods of the household electrical appliances in the room A and the room B, respectively. For example, when a morning conference is held once a week in the room A, the utilization times of the household electrical appliances to be used by the workers are shifted according to the period of the conference. In other words, since the morning conference was held in the morning of October 11 in the example of the room A (or a department) in FIG. 44A, the utilization periods of the household electrical appliances were shifted to the early periods. In contrast, in the room B (or department) in FIG. 44B, the workers started to conduct business every day almost at the same time without having the morning conference. Here, the household electrical appliances in the room B have regularly small variation (variance) in the utilization periods, and it is determined that changing the utilization periods are difficult. On the other hand, since the morning conference is held in the room A, it is determined that the utilization periods are easily changed.

As such, it is possible to propose to the user changing utilization periods of household electrical appliances in an office and others as described in Embodiment 2 by categorizing the household electrical appliances into some classes per place.

A part of or an entire of the constituent elements included in each of the utilization-time changing support devices may be configured of a system Large Scale Integration (LSI). The system LSI is a super multi-functional LSI manufactured by integrating the constituent elements into a single chip. More specifically, the system LSI is a computer system including a microprocessor, a ROM, and a RAM. The RAM stores a computer program. The microprocessor operates according to the computer program, so that the system LSI fulfills the functions.

Furthermore, a part of or an entire of the constituent elements included in the utilization-time changing support device may be configured of an IC card or a single module detachable from the device. The IC card or the module is a computer system including the microprocessor, the ROM, and the RAM. The IC card or the module may include the super multi-functional LSI. The microprocessor operates according to the computer program, so that the IC card or the module fulfills the functions. The IC card or the module may have tamper-resistance.

The present invention may be any of the above methods. Furthermore, the present invention may be a computer program which causes a computer to execute these methods, and a digital signal included in the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc (BD) (R), and a semiconductor memory. Moreover, the present invention may be the digital signal recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a microprocessor and a memory. The memory may store the computer program, and the microprocessor may operate according to the computer program.

Furthermore, the present invention may execute the computer program or the digital signal in another independent computer system by recording the computer program or the digital signal on the recording medium and transporting the recording medium, or by transmitting the computer program or the digital signal via a network and the like.

Embodiments and modifications may be combined.

Embodiments disclosed this time are exemplifications in all respects, and should be regarded as not limiting the scope of the present invention. The scope is indicated not by the description but by Claims, and is intended to include all the modifications within Claims, meanings of equivalents, and the scope of the equivalents.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to a utilization-time changing support device and others to generate advices for the user in order to shift the total amount of power consumption in a household according to an actual usage of household electrical appliances held in the household.

What is claimed is:

1. A utilization-time changing support device comprising:
a processor; and
a non-transitory computer-readable recording medium having stored thereon executable instructions, which when executed by said processor, cause said utilization-time changing support device to function as:
a household-electrical-appliance power record storage unit configured to store records of power consumption for a plurality of household electrical appliances used in a household;
a power record writing unit configured to receive information indicating the power consumption of each household electrical appliance of the plurality of household electrical appliances from a measuring device that measures the power consumption, and write, into said household-electrical-appliance power record storage unit, a record of the information as one of the records of the power consumption;
a regular use determining unit configured to determine whether or not a household electrical appliance of the plurality of household appliances used during a predetermined time range in a first day is used during the predetermined time range in a second day different from the first day to determine whether or not the household electrical appliance is regularly used during the predetermined time range, based on the records of the power consumption stored in said household-electrical-appliance power record storage unit, the predetermined time range being shorter than one day;

a period change possibility determining unit configured to determine a degree of variation between a utilization period of the household electrical appliance on the first day and a utilization period of the household electrical appliance on the second day, and output (i) whether or not a utilization period of the household electrical appliance determined by said regular use determining unit as being regularly used can be changed, based on the determined degree of variation and (ii) an other utilization period as a result of the determination, based on the records of the power consumption of the household electrical appliance; and an operation control unit configured to change the utilization period of the household electrical appliance based on a result of the determination of said regular use determining unit and a result of the determination of said period change possibility determining unit, and control an operation of the household electrical appliance according to the change of the utilization period of the household electrical appliance.

2. The utilization-time changing support device according to claim 1,
wherein said period change possibility determining unit is configured to determine that a possibility of changing the utilization period of the household electrical appliance is higher as the degree of variation between utilization periods of the household electrical appliance on the first day and the second day is higher, the household electrical appliance being determined by said regular use determining unit as being regularly used.

3. The utilization-time changing support device according to claim 1, wherein the executable instructions, when executed by said processor, cause said utilization-time changing support device to further function as:
a household-electrical-appliance power characteristics storage unit configured to store, for each household electrical appliance to be used in the household, utilization method changing information indicating whether or not a utilization period of each household electrical appliance can be changed,
wherein said period change possibility determining unit is configured to determine, only for the household electrical appliance indicated by the utilization method changing information that the utilization period of the household electrical appliance can be changed, whether or not the utilization period can be changed based on the records of the power consumption of the household electrical appliance.

4. The utilization-time changing support device according to claim 3,
wherein the utilization method changing information further includes process information on operations of each of the household electrical appliances, and
said period change possibility determining unit is configured to determine whether or not the utilization period can be changed per process, with reference to the process information.

5. The utilization-time changing support device according to claim 4,
wherein the process information includes a drying process, and
said period change possibility determining unit is configured to determine whether or not a utilization period of the drying process can be changed.

6. The utilization-time changing support device according to claim 1, wherein the executable instructions, when executed by said processor, cause said utilization-time changing support device to further function as:
a by-lifestyle household electrical appliance storage unit configured to store, for each lifestyle, information on a household electrical appliance that is more likely to be used in conjunction with the lifestyle; and
a lifestyle period determining unit configured to determine a period of each of the lifestyles, based on the information stored in said by-lifestyle household electrical appliance storage unit and the records of the power consumption of the household electrical appliances,
wherein said regular use determining unit is configured to determine, for each of the lifestyles, whether or not the lifestyle is regularly repeated, the lifestyle having the period determined by said lifestyle period determining unit, and
said period change possibility determining unit is configured to determine (i) whether or not the period of the lifestyle can be changed and (ii) an other period of the lifestyle, based on the records of the power consumption of the household electrical appliances included in the lifestyle determined by said regular use determining unit as being regularly repeated, and output a result of the determination.

7. The utilization-time changing support device according to claim 6,
wherein the lifestyle is a daily life event defined by use of the plurality of household electrical appliances,
said by-lifestyle household electrical appliance storage unit is configured to store, for each daily life event, information on the household electrical appliances that are more likely to be used in conjunction with the daily life event,
said lifestyle period determining unit is configured to determine a period of each of the daily life events, based on the information stored in said by-lifestyle household electrical appliance storage unit and the records of the power consumption,
said regular use determining unit is configured to determine, for each of the daily life events, whether or not the daily life event determined by said lifestyle period determining unit is regularly repeated, and
said period change possibility determining unit is configured to determine (i) whether or not a period of the daily life event can be changed and (ii) an other period of the daily life event, based on the records of the power consumption of the household electrical appliances included in the daily life event determined by said regular use determining unit as being regularly repeated, and output a result of the determination.

8. The utilization-time changing support device according to claim 1, wherein the executable instructions, when executed by said processor, cause said utilization-time changing support device to further function as:
a utilization start time predicting unit configured to predict a utilization start time of the household electrical appliance, based on the records of the power consumption stored in said household-electrical-appliance power record storage unit,
wherein said period change possibility determining unit is configured to determine (i) whether or not the utilization period including the utilization start time of the household electrical appliance determined by said regular use determining unit as being regularly used can be changed to an other utilization period and (ii) the other utilization period, based on the records of the power consumption of the household electrical appliance, and output a result of the determination, the utilization start time being predicted by said utilization start time predicting unit.

9. The utilization-time changing support device according to claim 8, wherein said utilization start time predicting unit is configured to determine knowledge on the utilization start time of the household electrical appliance, from a degree of variation in utilization start times of the household electrical appliance to which an incidental condition is assigned, based on the records of the power consumption of the household electrical appliance stored in said household-electrical-appliance power record storage unit, and said period change possibility determining unit is configured to determine the utilization start time of the household electrical appliance predicted by said utilization start time predicting unit, from a result of the incidental condition.

10. The utilization-time changing support device according to claim 8, wherein said utilization start time predicting unit is configured to determine knowledge that a second household electrical appliance of the plurality of household appliances starts to be used after a predetermined time of operating a first household electrical appliance of the plurality of household appliances, based on the records of the power consumption stored in said household-electrical-appliance power record storage unit, when a probability that the second household electrical appliance starts to be used after the predetermined time of operating the first household electrical appliance is higher than a predetermined threshold, and said period change possibility determining unit is configured to determine the utilization start time of the household electrical appliance predicted by said utilization start time predicting unit, based on (i) the knowledge determined by said utilization start time predicting unit and (ii) the operations on the first and second household electrical appliances.

11. The utilization-time changing support device according to claim 1, wherein the executable instructions, when executed by said processor, cause said utilization-time changing support device to further function as:

a household power record storage unit configured to store records of total power consumption in the household;

a peak power consumption time detecting unit configured to detect the peak power consumption time at which a total amount of power consumption is larger than a predetermined value, from the records of total power consumption stored in said household power record storage unit; and a utilized household electrical appliance identifying unit configured to identify a household electrical appliance that uses power at the peak power consumption time, based on the records of the power consumption stored in said household-electrical-appliance power record storage unit and the peak power consumption time detected by said peak power consumption time detecting unit, wherein said regular use determining unit is configured to determine whether or not the household electrical appliance identified by said utilized household electrical appliance identifying unit is regularly used, based on the records of the power consumption stored in said household-electrical-appliance power record storage unit.

12. The utilization-time changing support device according to claim 1, wherein said period change possibility determining unit is configured to determine the other utilization period from within a period of the household electrical appliance determined by said regular use determining unit as being regularly used, the period having a past utilization record.

13. A method of supporting change in a utilization time of a household electrical appliance, said method being performed by a computer and comprising:

receiving information indicating power consumption of the household electrical appliance from a measuring device that measures the power consumption, and writing, into a household-electrical-appliance power record storage unit that stores records of the power consumption, a record of the information as one of the records of the power consumption;

determining whether or not the household electrical appliance used during a predetermined time range in a first day is used during the predetermined time range in a second day different from the first day to determine whether or not the household electrical appliance is regularly used during the predetermined time range, based on the records of the power consumption stored in the household-electrical-appliance power record storage unit, the predetermined time range being shorter than one day;

determining a degree of variation between a utilization period of the household electrical appliance on the first day and the utilization period of the household electrical appliance on the second day;

outputting (i) whether or not a utilization period of the household electrical appliance determined in said determining as being regularly used can be changed, based on the determined degree of variation and (ii) an other utilization period as a result of the determination, based on the records of the power consumption of the household electrical appliance; and changing the utilization period of the household electrical appliance based on a result of the determination of the household electrical appliance being regularly used during the predetermined time range and a result of the determination of the degree of variation, and controlling an operation of the household electrical appliance according to the changing of the utilization period of the household electrical appliance.

14. A non-transitory computer-readable recording medium for use in a computer, the recording medium having a computer program recorded thereon for causing the computer to execute:

receiving information indicating power consumption of a household electrical appliance from a measuring device that measures the power consumption, and writing, into a household-electrical-appliance power record storage unit that stores records of the power consumption, a record of the information as one of the records of the power consumption;

determining, using a processor, whether or not the household electrical appliance used during a predetermined time range in a first day is used during the predetermined time range in a second day different from the first day to determine whether or not the household electrical appliance is regularly used during the predetermined time range, based on the records of the power consumption stored in the household-electrical-appliance power record storage unit, the predetermined time range being shorter than one day;

determining a degree of variation between a utilization period of the household electrical appliance on the first day and the utilization period of the household electrical appliance on the second day;

outputting (i) whether or not a utilization period of the household electrical appliance determined in said determining as being regularly used can be changed, based on the determined degree of variation and (ii) an other utilization period as a result of the determination, based on the records of the power consumption of the household electrical appliance; and changing the utilization period of the household electrical appliance based on a result of the determination of the household electrical appliance being regularly used during the predetermined time range and a result of the determination of the degree of variation, and controlling an operation of the household electrical appliance according to the changing of the utilization period of the household electrical appliance.

\* \* \* \* \*